United States Patent

[11] 3,593,124

| [72] | Inventors | Gilbert Moise Cahen<br>Paris;<br>Henri Georges Guyard, Paris; Michel Henry Pierre Souillard, Fontenay-aux-Roses, all of, France |
|---|---|---|
| [21] | Appl. No. | 734,027 |
| [22] | Filed | June 3, 1968 |
| [45] | Patented | July 13, 1971 |
| [73] | Assignee | Compagnie Des Compteurs |
| [32] | Priority | June 1, 1967, Mar. 20, 1968 |
| [33] | | France |
| [31] | | 108,704 and 144,506 |

[54] METHOD AND DEVICE FOR DETECTING AND LOCALIZING PHASE-TO-PHASE AND PHASE-TO-EARTH FAULTS WHICH OCCUR IN A SECTION OF A POLYPHASE ALTERNATING CURRENT LINE
16 Claims, 21 Drawing Figs.

| [52] | U.S. Cl. | 324/52 |
|---|---|---|
| [51] | Int. Cl. | G01r 31/08 |
| [50] | Field of Search | 324/51, 52; 317/27, 36 |

[56] References Cited
UNITED STATES PATENTS

| 3,048,744 | 8/1962 | Warrington | 317/27 |
|---|---|---|---|
| 3,099,775 | 7/1963 | Mortlock et al. | 317/36 |
| 3,163,802 | 12/1964 | Seguin et al. | 317/36 |
| 3,369,156 | 2/1968 | Souillard | 317/36 |
| 3,408,564 | 10/1968 | Hoel | 324/52 |

Primary Examiner—Gerard R. Strecker
Attorney—Pierce, Scheffler & Parker

ABSTRACT: A method for detection of faults in a polyphase alternating current transmission line system includes the steps of measuring the voltage, current and derivative of the latter for each phase, formulating the equations for the relationship between the measured values of different phases in accordance with Ohm's law, transforming these equations into forms having straight line characteristics by application of numerical coefficients, and repeating the foregoing steps at regular intervals to obtain successive straight lines which intersect in a single point and the coordinates of which characterize the operation of the system thus to show line operation in either a normal manner or the existence of a phase-to-phase or phase-to-earth fault. The related apparatus for carrying out the method includes various instruments for measuring the voltage, current and derivative of the current at regular intervals, instruments for recording the data and a computer for processing the data thus obtained.

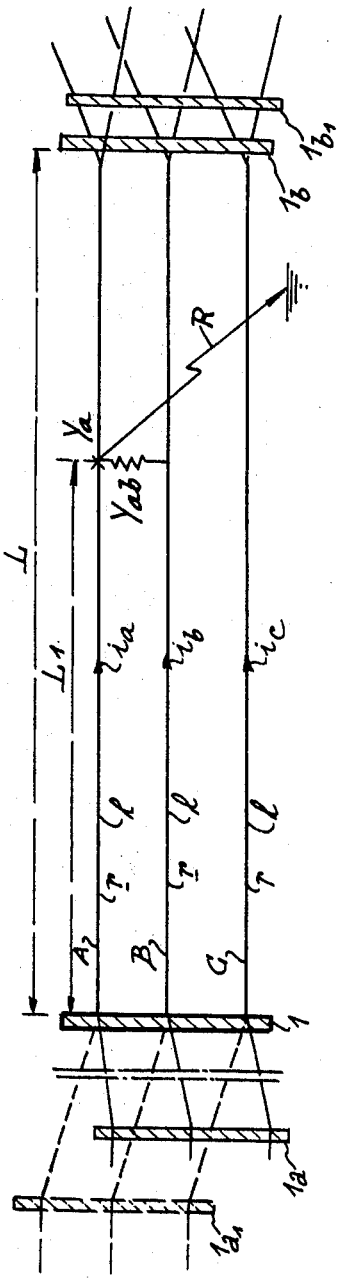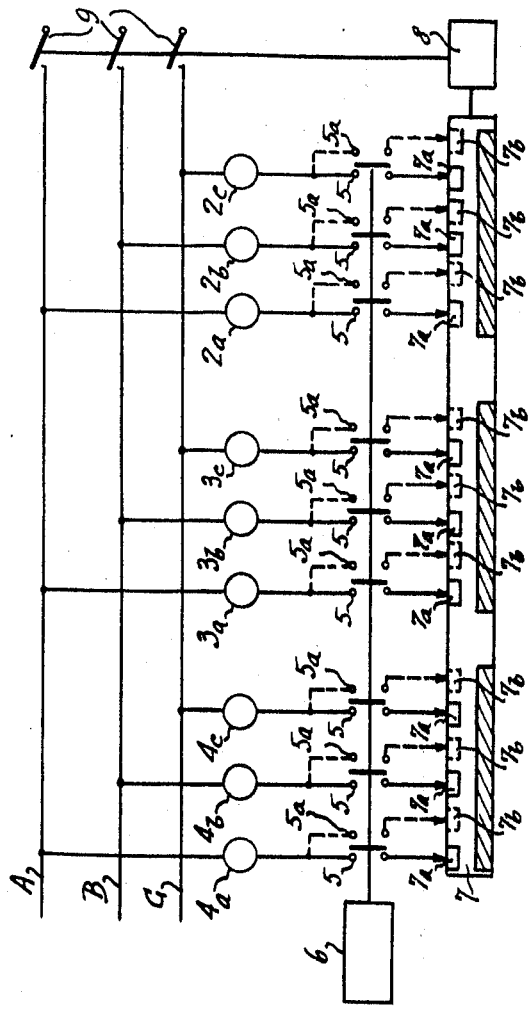

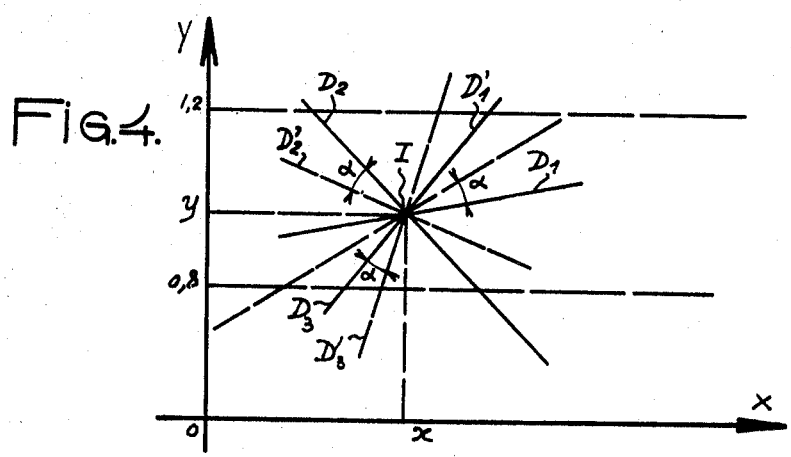
Fig.4.
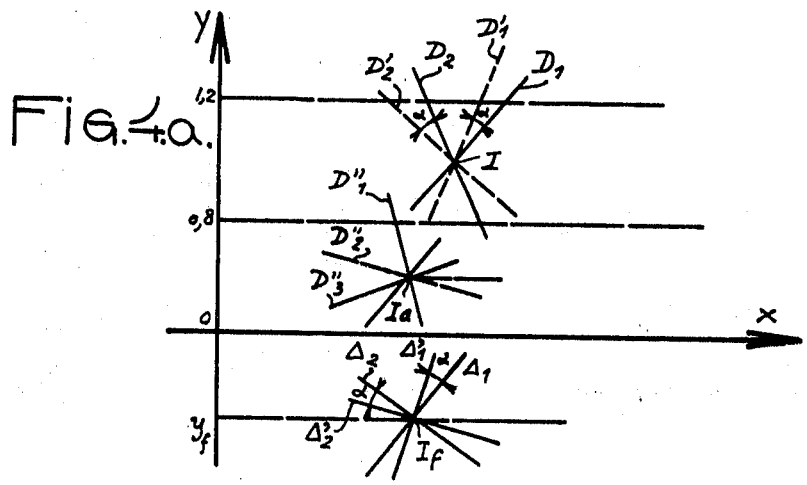
Fig.4.a.
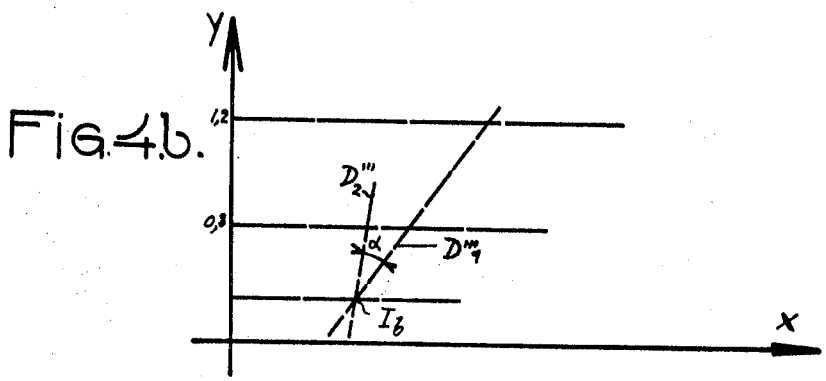
Fig.4.b.

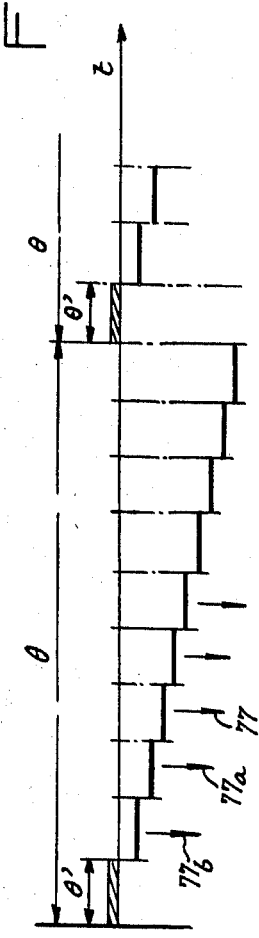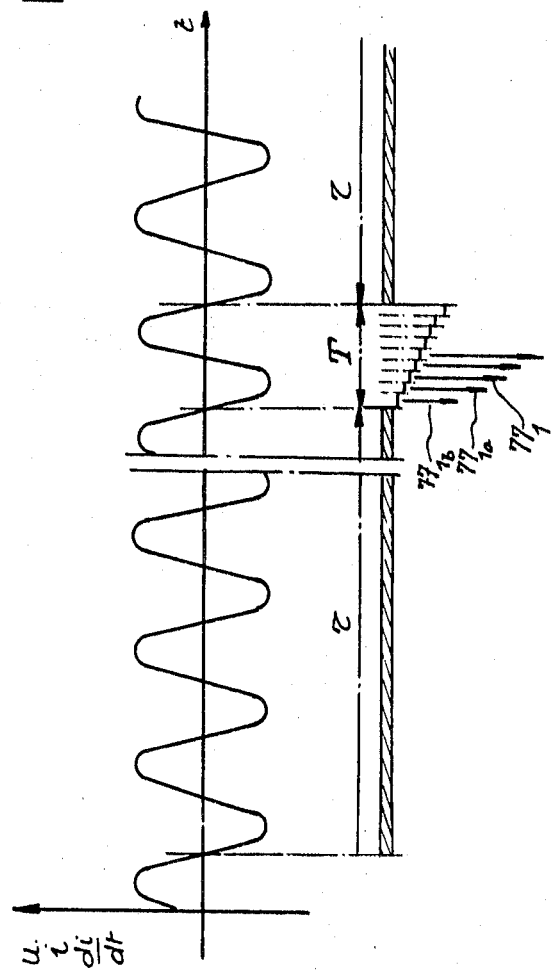

METHOD AND DEVICE FOR DETECTING AND LOCALIZING PHASE-TO-PHASE AND PHASE-TO-EARTH FAULTS WHICH OCCUR IN A SECTION OF A POLYPHASE ALTERNATING CURRENT LINE

This invention relates to the permanent supervising of very high voltage alternating current lines and concerns a new method of detecting and localizing faults that may occur either between phases, or between one or more phases and the earth.

According to the invention, the method, enables detecting and localizing fault despite the appearance of exponential transitory currents, then, if so required, the isolating of a section of line in the case a fault occurs, and this in a very short time, in the region of a few milliseconds, so that deteriorations that might be caused by a serious fault are thus eliminated.

The method of the invention, in addition to checking the existence, or not, of a fault and which makes it possible precisely to ascertain its spot and also, subsidiarily, to enable to be known at each moment both the active power as well as the reactive power transported by the network and this by simple means not requiring operations other than those ordinarily carried out during the supervision of a network under normal circumstances.

Another advantage of the method of the invention is that it makes it possible to take into account measuring errors, inherent to measuring appliances.

According to the method of the invention, one measures simultaneously, for each phase, the voltage, current intensity and derivative $di/dt$ function thereof, one groups according to Ohm's law said measurements made simultaneously, one regroups the terms of Ohm's law according to said measurements under the form of additions of two products, which respectively are additions equal to the voltage drops along the line, one gives respectively to these two products numerical coefficients so that to obtain the equation of straight lines coinciding at a fixed point, one repeats the simultaneous measurement of the voltage, current intensity and derivative function thereof for each phase at regular intervals, one obtains, at each measurement, new straight lines passing by said fixed point but turned in relation to the preceding straight lines by an angle corresponding to the time interval separating two measurements and to the current frequency of the network, so as straight lines are obtained turning around a fixed point which is characteristic of the apparent resistance and inductance of the line, the position is ascertained of the point at which each straight line concurs with the straight line obtained by the preceding measurement, and this in relation to a system of coordinates corresponding to said numerical coefficients and if said point is situated in a preestablished zone of coordinates, said line section is caused to be tripped out.

The invention also applies to a device for operating the preceding method, a device so working that almost all the members that it comprises are automatically insulated from the potential of the line, which is most important when the voltage transported is very high, for instance, in the region of a megavolt.

According to this second aspect of the invention, the device comprises, on each phase conductor, a device sensitive to the voltage between this phase and the earth, a device sensitive to the current intensity circulating in said conductor and a device producing the derivative of said current intensity, at least one measuring member associated with each of said devices, at least one switching element connected to each of said measuring members, of recording elements selectively connected to said switching members, at least one clockwork for controlling simultaneously said switching members, causing, at regular intervals, the closing of said switching members during a sampling time and a computing assembly connected to said recording elements, so that the measurements made by the devices connected to each phase conductor during the sampling time, are successively led to the recording elements between said sampling time and treated by the computing assembly.

Various other characteristics thereof will be revealed by the detailed description which follows.

Forms of embodiment of the object of the invention are shown, by way of nonrestrictive examples, in the accompanying drawings.

FIG. 1 is a diagram of a powerline provided with detecting and localizing devices of faults according to the invention.

FIG. 2 is a diagram symbolically illustrating a measuring and handling device for data to be considered in the method of the invention.

FIGS. 4 to 4b are curves illustrating the result of handling the data produced in accordance with the method of the invention in the case of normal working and disturbed working.

FIGS. 15 and 16 are diagrams explaining some of the operations carried out by the device according to the embodiment of FIG. 14.

Figure 3:
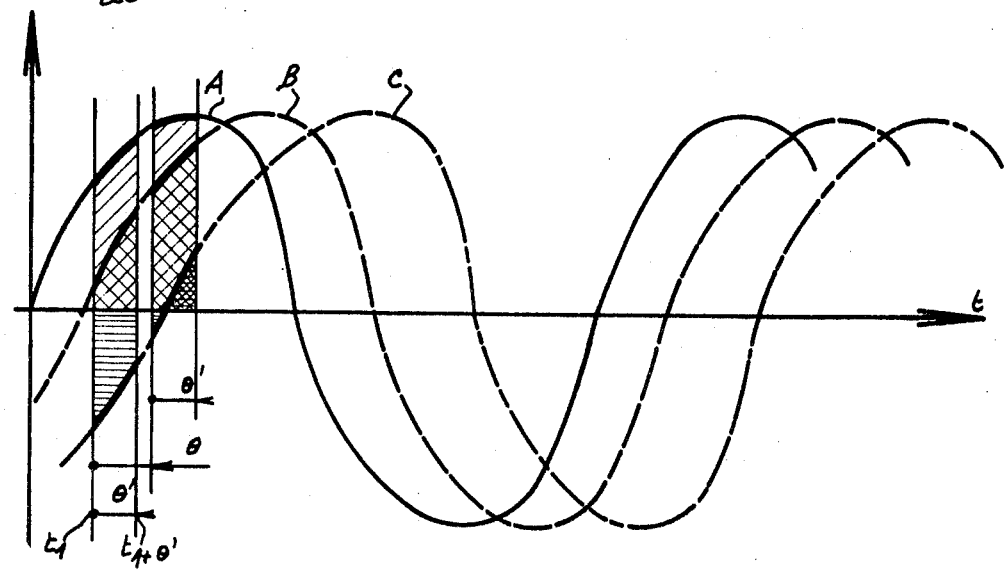
FIG. 3 is a curve illustrating an essential characteristic of the method of the invention.

FIG. 1 diagrammatically illustrates a three-phase alternating electric powerline whose three-phase conductors are respectively designated by the letters A, B, C. The device of the invention for detecting and localizing eventual faults is placed at one of the ends of a section of the network, this section being designated by the letter L. This detection device, which bears the reference numeral 1 is shown by a thick solid line to distinguish it from other similar devices designated by $1a$, $1a_1$ on the one hand, and $1b$, $1b_1$ on the other. The devices $1b$, $1b_1$ are mounted at the downstream end of the section L to be protected and consequently, in that which follows, "downstream" fault designates any fault that might occur, on the same side of the detecting device 1 as $1b$, in other words, in the section L or beyond the devices $1b$. The faults which may occur on the other side of the detecting device 1 on sections of line at whose ends devices $1a$ and $1a_1$ are provided, are consequently designated in that which follows as "upstream faults."

Each detecting device comprises, as shown in FIG. 2, three distinct measuring assemblies, namely:

1. three measuring appliances $2a$, $2b$, $2c$ of the direct voltages between each of the phase conductors A, B and C and the earth;
2. three measuring appliances $3a$, $3b$, $3c$ of the current intensities circulating in the three-phase conductors A, B, C;
3. three measuring appliances $4a$, $4b$, $4c$ of the derivatives of the current intensities of said three-phase conductors A, B, C.

The electric magnitudes measured by the above-mentioned three groups of appliances are independently transmitted, by switching devices 5, simultaneously actuated from a clockwork control 6 of which the duration of the working cycle is designated in what follows by the letter $\theta$, said clockwork acting so that the switches 5 are closed for allowing data to pass coming from said measuring appliances during a $\theta'$ time, which is obviously less than the $\theta$ time.

In addition to other treatments referred to further on, data coming from the three groups of three measuring appliances are applied to memory assemblies designated by 7a in which said data are retained during various times to be then taken out and dealt with in a computer 7 making possible, by operating the method described in what follows, the ascertaining of the existence of faults on the phase conductors A, B and C in the section L to be supervised. The computer 7, when it detects a fault, controls the functioning of receiving mechanisms 8, ensuring, for instance, the tripping of a circuit breaker 9 and other signalling members pertinent to the protection technique of powerlines.

ASCERTAINING THE EXISTENCE OF FAULTS

To facilitate the understanding of the invention, it is advisable to refer to the laws established for electricity and most particularly, Ohm's law. To this end, we designate:

1. by $u_a$, $u_b$ and $u_c$ the instantaneous values of simple voltages that can be measured by the appliances 2a, 2b, 2c of the detection device 1;
2. by $i_a$, $i_b$ and $i_c$ the values, also instantaneous, of currents circulation in the phase conductors A, B, C;
3. by $i_h$ the value of the homopolar component of currents when such component exists, i.e., at the time of a fault between a phase and earth, the current $i_h$ being thus equal as it is known to the sum of the currents $i_a$, $i_b$, $i_c$;
4. by $r$ the ohmic resistance of each phase conductor A, B, C;
5. by $l$ the self-inductance of these conductors;
6. by $R$, the resistance of the fault when the latter exists;
7. by $r_h$ and $l_h$, respectively, the ohmic resistance and self-inductance of the homopolar component starting, in the case of a fault at the earth;
8. by $R_n$ and $L_n$, respectively, the apparent resistance and self-inductance of each phase conductor when a fault does not exist;
9. by $i$ the instantaneous value of the fault current;
10. by $K$ a real number pertinent to the characteristics of the line, particularly its direct impedance and homopolar impedance, this number being involved in ascertaining the fault current when there is a fault at the earth.

11 — by $u_{ab} = u_b - u_a$ $u_{bc} = u_c - u_b$ $u_{ca} = u_a - u_c$ the instantaneous values of voltages composed between phases, the indices $a$, $b$ and $c$ indicating the various phases to which these voltages refer.

If we consider the network in normal circumstances, Ohm's law regarding phase A is put down:

$$u_a = R_n i_a + L_n \frac{di_a}{dt} \quad (1)$$

This formula is, in short, the definition of the apparent resistance and inductance.

This Ohm's law would obviously be written in the same manner about phases B and C:

As is known, two cases of faults may occur, namely:

I. a fault between two phase conductors. In this case, account must be taken of the compound voltages precedingly defined and Ohm's law is then written:

$$u_{ab} = y_{ab}\left[ 1\frac{d(i_b - i_a)}{dt} + r(i_b - i_a) \right] + Ri$$

$y_{ab}$ being a coefficient without dimension which is equal to the distance of the fault compared to the length of the section taken as unit, i.e., by referring to FIG. 1 regarding the ratio $L_1/L$ where $L_1$ is the distance separating the fault from the detecting device 1. Moreover, $i$ which is the fault current and which is of high value in relation to the current circulating in the line before the fault can be considered as appreciably in phase with the current $i_a - i_b$ so that this current $i$ is proportional to $i_b - i_c$ and that we may write $i = K'(i_b - i_a)$ and then the Ohm's equation becomes:

$$u_{ab} = y_{ab}\left[ 1\frac{d(i_b - i_a)}{dt} + r(i_b - i_a) \right] + K'R(i_b - i_a) \quad (2)$$

The equation (2) concerning the pair of phases A and B is the same for the pairs of phases B and C, as well as C and A and is respectively written:

$$u_{bc} = y_{bc}\left[ 1\frac{d(i_c - i_b)}{dt} + r(i_c - i_b) \right] + K'_1 R_1(i_c - i_b) \quad (2a)$$

$$u_{ca} = y_{ca}\left[ 1\frac{d(i_a - i_c)}{dt} + r(i_a - i_c) \right] + K'_2 R_2(i_a - i_c) \quad (2b)$$

II. A fault between a phase and the earth.

In this case, account must be taken of the homopolar compounds and by supposing, as shown in FIG. 1, that the fault has occurred between phase A and the earth, whereas Ohm's law for said phase A must be written:

$$u_a = y_a\left[ r(i_a - i_h) + 1\frac{d}{dt}(i_a - i_h) + r_h i_h + l_h \frac{di_h}{dt} \right] + Ri$$

In this case, the fault current $i$ is appreciably in phase with the homopolar current $i_h$ and thus proportional to it, so that it is possible to write that:

$$i = K i_h$$

and then, the equation becomes:

$$u_a = y_a\left[ r(i_a - i_h) + 1\frac{d}{dt}(i_a - i_h) + r_h i_h + l_h \frac{di_h}{dt} \right] + KRi_h \quad (3)$$

As previously, the equations determining $u_b$ and $u_c$ are similar:

It has been noticed that both the equation (1) as well as the equations (2) and (3) above can be written differently by regrouping their terms so that we obtain new equations having the same meaning, but corresponding from the standpoint of shape, respectively to the equation of a straight line. Actually, it is possible to write, by referring to the equation (2), the following relations:

$$1\frac{d(i_b - i_a)}{dt} = w_{ab}$$

$$r(i_b - i_a) = v_{ab}$$

and $$y_{ab} + K'\frac{R}{r} = x_{ab}$$

In this case, the equation (2) becomes:

$$u_{ab} = x_{ab}v_{ab} + y_{ab}w_{ab} \quad (4)$$

an equation in which $w_{ab}$ corresponds to inductive voltage drops and $v_{ab}$ to resistive voltage drops, which can be immediately known from indications supplied by the measuring appliances of FIG. 2. Actually, the value of $w$ is the product of the known inductance $l$ by the difference of values appearing on the measuring appliances 4b and 4a. Likewise, the value of $v$ is the product of the known resistance $r$ by the difference of the values appearing at the measuring appliances 3b and 3a; $u_{ab}$ can also be easily ascertained, because it corresponds to the difference of values given by the measuring appliances 2b and 2a. In the equation (4) above, $x$ and $y$ are not known, and consequently, it is the coefficients to which values of any kind can successively be given so that said equation (4) enables a straight line to be drawn.

The straight line according to the equation (4) is shown at $D_1$ in FIG. 4. Similar straight lines to those of the equation (4), thus representing the equations (2a) and (2b) are also drawn as shown at $D_2$ and $D_3$.

As shown by the drawing, the three straight lines $D_1$, $D_2$, $D_3$ are concurrent at a common point I, for in normal circumstances Ohm's law of equation (1) can also be transformed by grouping these terms so that they correspond to the equation of a straight line. Actually, the apparent resistance $R_n$ as well as the apparent inductance $L_n$ may be replaced by the product of the resistance and inductance of the section to be supervised respectively affected to the coefficients $x$ and $y$. In other words, the equation (1) may be written:

$$u_a = x_a r\, i_a + y_a l\, (di_a/dt)$$

and in writing that:
$$r\, i_a = v_a$$

and that:
$$l\, (di_a/dt) = w_a$$

we obtain the equation:

$$u_a = x_a v_a + y_a w_a \qquad (5)$$

and in like manner, the equations:

$$u_b = x_b v_b + y_b w_b \qquad (5a)$$

$$u_c = x_c v_c + y_c w_c \qquad (5b)$$

These equations are analogous to each of the three equations (4) seeing that said equations (4) respectively represent the difference two by two of the equations (5), (5a), (5b) under normal circumstances.

In the equations (4), the coefficients $x_{ab}$, $x_{bc}$, $x_{ca}$ on the one hand, and $y_{ab}$, $y_{bc}$ and $y_{ca}$ on the other, being respectively identical, it follows that said straight lines really concur at a common point.

NORMAL CONDITIONS

As shown by the foregoing, in normal circumstances, the magnitudes $u$, $v$ and $w$ appear in the equations (4), of three pairs of phases considered and are sinusoidal functions of time of the same angular frequency and, consequently, the straight lines $D_1$, $D_2$, $D_3$ all three turn around a fixed point which is the point I to which said straight lines concur and which, in what follows are called "image point," this point having for abscissa $x$ and for ordinate $y$ (FIG. 4).

We thus see from the foregoing, that by drawing straight lines according to the equations (4) at regularly spaced-out intervals, for instance, by time intervals $\theta$ defined in the foregoing, we obtain, during a first closing of the switches 5 of FIG. 2, data enabling straight lines $D_1$, $D_2$, $D_3$ to be drawn, and during a second closing, a second cluster of straight lines $D_1'$, $D_2'$, $D_3'$ staggered by the same angle $\alpha$ and concurring always at the point I.

In what follows and to facilitate the understanding of certain characteristics of the invention, we consider that the time interval $\theta$ is equal to one-sixteenth of a period of the alternating current carried by the line, this current being at 50 cycles/second. Consequently, the time interval $\theta$ is equal to 1.25 ms. In these conditions, the angles $\alpha$, respectively formed by the straight lines $D_1\, D_1'\, D_2\, D_2'$ and $D_3\, D_3'$ are of 22.5°, thus sufficiently great so that there is no confusion in the drawing, even being fictitious, of successive straight lines revolving around the point I.

In normal conditions, the image point I shifts slightly in the plan of the coordinates X, Y as a function of the load of the network, but nevertheless, this point remains in its limited zone.

FAULT BETWEEN PHASES

If a fault occurs between phases A and B, as shown in FIG. 1, then the terms $v_{ab}$, $w_{ab}$, $v_{bc}$, $w_{bc}$ and $v_{ca}$, $w_{ca}$ of the equations (4) very sharply, so that after the fault if new lines are drawn, said lines are also angularly staggered by an angle $\alpha$ each $\theta$ milliseconds but, moreover, they concur at a new image point $I_a$ (FIG. 4a).

The ordinate $y$ if the image point $I_a$ gives the distance at which the fault between phases is found from the origin of the line, where the protection device 1 is placed, seeing that $y$ is equal to the ratio $L_1/L$. Consequently, it would seem that the computer 7 dealing with the data transmitted to it, should control the operating of the receiving mechanism 8, causing operation of the switch 9 of FIG. 2, as soon as the position of the image point $I_a$ corresponds to an ordinate $y < 1$. However, it has been noticed, that this condition was not satisfactory because the unavoidable measuring errors may sometimes reveal a ratio $L_1/L > 1$ and thus suggest a fault occurring in the downstream zone beyond the section to be supervised, whereas this fault would really be on said section or vice versa. To take this fact into account, one firstly ascertains a range for the ordinates $y$ of the point $I_a$ in which the putting into action of protecting members, for instance, switch 9, is not immediately assured. As an example, we consider, as shown in FIGS. 4 to 4b that this range lies between 0.8 and 1.2.

FAULT BETWEEN A PHASE AND THE EARTH

It is known that the homopolar components do not start unless such fault exists. According to the invention, when the device 1 is in the state called "watching," this device checks at regular time intervals, for instance, at each $\theta$ interval, so that no significant homopolar component exists which would indicate the existence of a fault. This supervision is effected by using the data coming from the groups of appliances 3a, 3b, 3c, on the one hand, and 4a, 4b, 4c, on the other, said data being fed at each $\theta$ time interval into the computer 7, where, every time it receives such data, an operation is carried out consisting of computing the components of the eventual homopolar current and its derivative, namely:

$$i_h = \tfrac{1}{3}(i_a + i_b + i_c)$$

and $$\frac{di_h}{dt} = \frac{1}{3}\left[\frac{d}{dt}(i_a + i_b + i_c)\right]$$

So that the line section supervised is not interrupted if a slight homopolar component appears, the receiving mechanism 8 of FIG. 2 is provided to act only in the case when homopolar components coming from one or other of the two last abovementioned equations exceed a given threshold, these thresholds being able, for instance, to be equal to a hundredth of the normal current and also equal to a hundredth of the derivative of this current, the exceeding of one or other of these thresholds being significant of a fault between phases. Of course, the absolute value of the sum of the algebraic values of the currents is theoretically nil but due to errors of measures said value appears not necessarily nil. It is the same concerning the derivatives. If $\epsilon$ represents the maximum value of the bucking errors as defined, the fact that at least one of the hereinafter inequalities are satisfied shows to the contrary the evidence of a significant homopolar component.

$$|i_a + i_b + i_c| > \epsilon[|i_a| + |i_b| + |i_c|]$$

$$\left|\frac{di_a}{dt} + \frac{di_b}{dt} + \frac{di_c}{dt}\right| > \epsilon\left[\left|\frac{di_a}{dt}\right| + \left|\frac{di_b}{dt}\right| + \left|\frac{di_c}{dt}\right|\right]$$

Additionally, provision is made to program the computer 7 so that it is able to solve the equation (3) belonging to each of the three phases A, B, C as soon as a significant homopolar component appears.

To solve the equation (3), one proceeds in a similar manner to that described above with regard to the equations (4) i.e., grouping the terms of the generalized Ohm's law for transforming said law into a straight line equation. For instance, it is possible to write in referring to said equation (3) that:

$$r(i_a - i_h) + l\, d/dt(i_a - i_h) + l_h(di_h/dt) = w_a$$

that:
$$r_h i_h = v_a$$

and that:
$$x_a = y_a + \frac{KR}{r_h}$$

In this manner, the equation (3) becomes:

$$u_a = x_a v_a + y_a w_a \qquad (6)$$

In like manner, the equations belonging to phases B and C are:

$$u_b = x_b v_b + y_b w_b \qquad (6a)$$

and $$u_c = x_c v_c + y_c w_c \qquad (6b)$$

Seeing that generalized Ohm's law according to the equation (3) can also be written in the form of a straight line equation, it is then possible to draw, as shown in FIG. 4b for phase A, and, at two successive instants separated by an $\theta$ time, two successive straight lines $D'''_1$ and $D'''_2$ revealing an image point $I_b$ whose ordinate $y$ indicates the spot where the fault lies.

We see by the foregoing that in all cases, i.e. under normal conditions, as in the case of a fault between phases or the case of a fault between phases and earth, we are always led to draw successive straight lines according to one and the same general equation:

$$u = x\, v + y\, w \quad (7)$$

which is made easy by a simple programming of a computer to which are fed, at regular spaced-out $\theta$ time intervals, data coming from the three groups of measuring appliances of FIG. 2.

In the foregoing, we have considered that the line is symmetrical. Nevertheless, if this is not the case, the meaning of the ordinate $y$ of the image point I remains the same, for only the magnitudes $v$ and $w$ reveal more complex expressions on taking into account existing asymmetries.

CHECKING THE LOCATION OF THE FAULT

A fault may exist on the line sections supervised by the detection devices $1a$ or $1a_1$ and perhaps detected by the device 1. Likewise, the device 1 can also detect faults on line sections extending downstream from the detection devices $1b$ or $1b_1$.

The power transport network being interconnected, it is obviously important that the section L which alone is to be protected by the detection device 1 must not be cut off if a fault occurs on one of the other sections described above. In other words, it is necessary to know accurately whether a fault detected by the device 1 is really on the line L, or, if, on the contrary, this fault is either beyond its end $1b$, or upstream.

A first step already described consists of not immediately causing the cutting out of the supervised L section if the ordinate of the image point I is comprised between 0.8 and 1.2 for instance. Actually, the range 0.8—1.2 concerns faults occuring in the vicinity of the protection devices $1b$ or $1b_1$, which are themselves sensitive to said faults. Consequently, when the fault detected by the device 1 seems to be placed in the vicinity of the downstream end of the section L, the computer 7 is programmed so that it does not cause the cutout at the moment when the fault is detected, so as to ascertain if, at the end of a predetermined $\theta$ time slightly bigger than the necessary time for a switch to cut out the current, the fault is still detected by the device 1. Actually, if said fault is downstream but beyond the section L, then the device $1b$, causes the cutout of the section it supervises and, consequently, the fault no longer appears on the device 1 at the moment when is taken the measurement which follows the cutout of the switch controlled by the device $1b$. If, on the other hand, the defect appears again to the device 1 after a time equal to the cutout maximum time, then the computer 7 of this device causes the cutting out of the section L.

The treatment of equation (1), (2) and (3) after their regrouping and drawing of successive straight lines determining the image points, enables one to determine the existence of a fault as well as its nature and the distance from the detention device 1. However, because of the measuring errors it could not be ascertained if the fault is downstream or upstream.

Again reverting to the same process consisting of drawing successive straight lines according to the general equation (7), the invention enables one to know with certainty whether the fault is really downstream or whether, being upstream, an immediate cutting out must not happen.

CASE OF A FAULT BETWEEN PHASES

Figure 6:
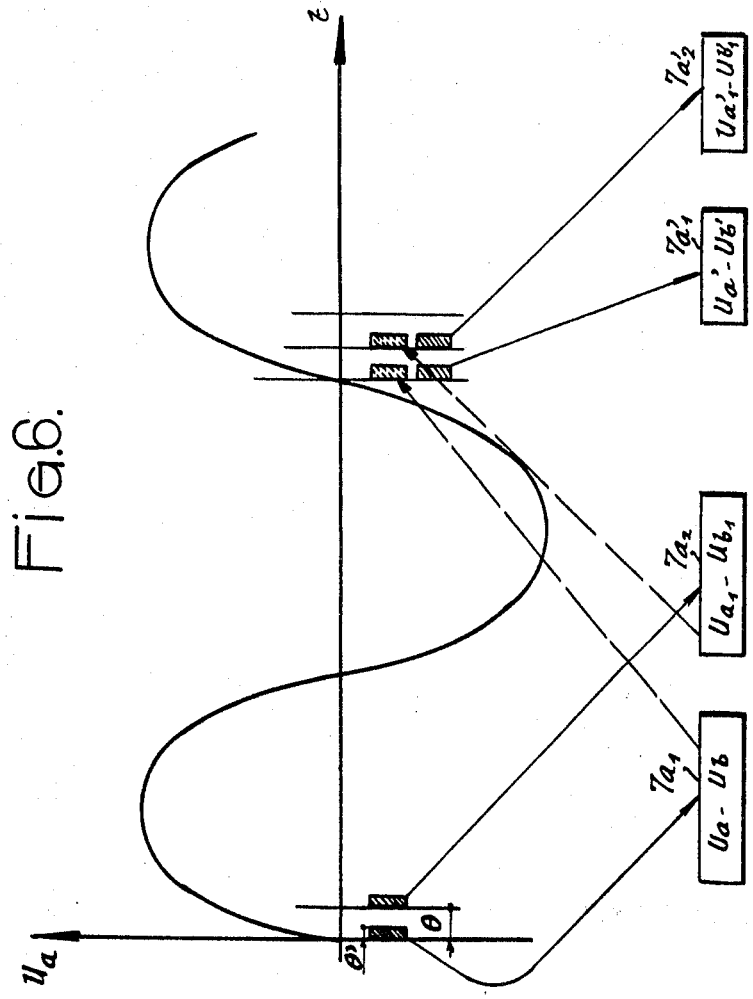
FIG. 6 is a curve showing another mode of handling data in accordance with the method of the invention.

With a view to the analysis of a fault between phases, the memories $7a$, at each moment when they are calculated, are fed with the values of the three compound voltages $u_a-u_b$, $u_b-u_c$ and $u_c-u_a$. The memories $7a$, or part of them, are provided for retaining said values of compound voltages during exactly one current period or an integer of periods, which is made apparent in FIG. 6 which shows that the value of $u_a-u_b$ is entered in the memory $7a_1$. At the end of a $\theta$ instant, a new value $u_{a1}-u_{b1}$ is computed and entered, as shown, in the memory $7a_2$, and so on. There must therefore be as many memories $7a_1$, $7a_2$, etc., as $\theta$ timelags exist in a period. In the example selected, there are thus, for each compound voltage, 16 memories per period.

At the end of a period, the same operations being carried out, the compound voltages $u_a-u_b$ are retained in the memories $7a_1'$, then, in like manner, after a new $\theta$ timelag, a new compound voltages $\underline{u}_{a_1'} - \underline{u}_{b_1'}$, in the memory $7a_2'$ and so on. In actual practice, the memories $7a_1$ and $7a_1'$, on the one hand, and $7a_2$, $7a_2'$, on the other, are the same, the value $u_a' - u_b'$ being substituted cyclically for the value $u_a-u_b$ at each new current period.

In this manner, there is permanently available the value of compound voltages computed at an earlier period, thus under the normal condition of the network. Obviously, one proceeds likewise with regard to the two other compound voltages $u_b-u_c$ and $u_c-u_a$ which are all cyclically renewed in the memories.

If, by $\bar{u}_{ab}$ we designate the value of $u_a-u_b$ contained in the memory $7a_1$ at the moment when we calculate the value:

$$, = \underline{u}_{a'} - \underline{u}_{b'}$$

being a later period, and if we substitute in the equation (4) $\bar{u}_{ab}$ to $u_{ab}$ without changing the other magnitudes, i.e., $\underline{x}_{a'b'} \cdot \underline{v}_{a'b'} + \underline{v}_{a'b'} \underline{w}_{a'b'}$, then, as shown in FIG. 4, we can draw the straight line $\Delta_1$. Then, at the following $\theta$ instant, we proceed in the same way with regard to the voltage $\bar{u}_{a_1b_1}$ retained in the memory $7a_2$ that is substituted in the equation (4) without changing the magnitudes that are introduced into this equation and which are those allowing the compound voltage $\underline{u}_{a'1b'1}$ to be introduced into the memory $7a_2'$. In this manner, the straight line $\Delta_1'$ is drawn, forming the angle $\alpha$ of 22.5° with the straight line $\Delta_1$. In the same manner, we draw the straight lines $\Delta_2$ and $\Delta_2'$ corresponding to the compound voltage $\bar{u}_{bc}$, and corresponding straight lines not shown, belonging to the voltage $\bar{u}_{ca}$, so that we obtain a fictitious image point $I_f$ which reveals an ordinate value $y_f$ whose absolute value has no meaning, but which is positive if the fault is downstream in relation to the detection device 1, and negative if the fault is upstream from said device 1.

The foregoing shows the great simplicity of the analysis of the situation of the fault, because it only needs to make two computations of the equations (4) by substituting for $u_{ab}$, $u_{bc}$ and $u_{ca}$, the value $\bar{u}_{ab}$, $\bar{u}_{bc}$ and $\bar{u}_{ca}$ of these compound voltages at an earlier period.

CASE OF A FAULT BETWEEN PHASES AND EARTH

In this case, there exist homopolar components of the voltage, current intensity and derivatives thereof, homopolar components of which the unique source is the fault and whose existence is supervised, then computed when it exceeds the previously mentioned thresholds.

The generalized Ohm's law applied to the homopolar components is:

$$\underline{u}_h = \underline{r}_h \underline{i}_h + \underline{l}_h \frac{di_h}{dt}$$

By proceeding in the same manner as for the regrouping of the terms of the equation (1), the above equation become:

$$u_h = x_h v_h + y_h w_h$$

and we draw this straight line at successive instants, separated by the $\theta$ time exactly as in the other preceding cases.

If the fault is downstream in relation to the detection device 1, $r_b$ and $l_h$ correspond to the impedance of the upstream circuit changed for sign seeing that normally we consider as positive which flow downstream, whereas under the effect of the fault, the homopolar source constituted only by the defect is downstream and the fictitious current flows upstream. On the other hand, if the fault is upstream, $r_h$ and $l_h$ correspond to the homopolar impedance of the downstream circuit and appear in the computation as positive without being in the vicinity of zero, even for a near fault, so that the ordinate $y_f$ of the fictitious image point obtained by drawing successive straight lines $$u_h = x_h v_h + y_h w_h$$

although without meaning in absolute value, gives by its sign the situation of the fault in relation to the detection device 1.

As a general rule, when the fault appears as an upstream one, even if this fault is of the type between phases or the type between a phase and the earth, then it will not be necessary for the detection device 1 to cause the cutting out of the section L that it supervises, for this cutout control belongs to one of the detection devices $1a$ or $1a_1$.

In actual practice, it is difficult, or even impossible, to make an instantaneous measurement that is workable for the nine electric magnitudes measured by the measuring appliances of FIG. 2. Nevertheless, it is possible to ascertain that the method described in the foregoing can be put into operation in the same manner by utilizing the mean values of said nine magnitudes, i.e., by integrating said magnitudes during $\theta$ times, called in what follows "integrating intervals," hence, to carry out:

$$\frac{1}{\theta'} \int_{t_1}^{t_1+\theta'} \underline{u} dt$$

provided that the instants $t_1$ at the beginning and $t_1+\theta'$ at the end of the integrating intervals are identical for the nine magnitudes, as shown in FIG. 3, where a sinusoidal curve is shown that can equally well be that corresponding to voltages, currents or derivative of the current for the three phases A, B and C. In this case, as shown FIG. $3a$, the integrating intervals $\theta'$ are obviously smaller than the $\theta$ sampling lag that must pass between two successive sampling measurements enabling two straight lines to be drawn. In the example considered up till now, there are thus 16 $\theta'$ integrating intervals per period, the duration of these $\theta'$ intervals requiring to be sufficiently short so that the time $\theta-\theta'$ separating two integrating intervals enables the transfer of data.

While it is desirable that a larger integrating intervals be used, for increasing the accuracy of the measurements, we then proceed as shown in FIGS. 2 and $3b$. According to FIG. 2, a second series of switches $5a$, shown by dotted lines and leading to memory groups $7b$, is provided so that this second series of switches are simultaneously closed and in alternation with the series 5. As shown in figure $3a$, the switch series 5 can also provide $\theta'$ integrating intervals, for instance, every two $\theta$, and this applies for the series of switches $5a$, the time intervals separating the beginning of two consecutive integrating intervals $\theta'$ in a same group of memories being equal to $2\theta-\theta'$, whereas the time available for the transmitting data is then equal to $2\theta-\theta'$. If so required, more than two series of switches cyclically alternated can be provided.

ASCERTAINING ACTIVE AND REACTIVE POWERS

As explained in the foregoing, for drawing successive straight lines similar to the straight lines $D_1$ and $D_1'$ of FIG. 4, we measure and respectively compute the magnitudes $u$, $v$ and $w$. At the moment $t$ the straight line $D_1$ corresponds to the equation:

$$u_1 = x v_1 + y w_1$$

Moreover, the straight line $D_1'$, drawn at the moment $t_1+\theta$, corresponds to the equation:

$$u_2 = x v_2 + y w_2$$

Seeing that the straight lines $D_1$ and $D_1'$ concur at image point I, it is possible very easily to determine the coordinates of said point. Actually, $x$, abscissa of point I is equal to:

$$x = \frac{u_1 v_2 - u_2 v_1}{w_1 v_2 - w_2 v_1} \qquad (8)$$

and $y$, ordinate of I is equal to:

$$\underline{y} = \frac{u_1 w_2 - u_2 w_1}{v_1 w_2 - v_2 w_1} \qquad (9)$$

In actual practice, the straight lines, such as $D_1$ and $D'_1$ of FIG. 4 are not actually drawn, because only the electric magnitudes that they determine are utilized in a computer and this computer is advantageously programmed for solving with their numerical values, the numerators of the equations (8) and (9) above, at the same time that they make the computation of the compound voltage $u_{ab}$ actually corresponding to the straight lines $D_1$ and $D'_1$, so as to ascertain after each integrating moment $\theta'$ the coordinates of the image point I.

As a matter of fact, according to the invention, one notices in a surprising manner that the numerator of the equation (8) and the numerator of the equation (9) are respectively proportional to the active and reactive power circulating in the line sections supervised. Consequently, a totalizing of the energies i.e. an integrating of said active and reactive powers may be done by the computer, because each sampling moment causes a mean value of these powers to appear during each $\theta'$ intervals and this in the course of the normal work of said computer for determining the image point I under normal conditions.

It has also been noticed that the same result can also be obtained by replacing the sign $-$ of each of the numerators of the equations (8) and (9) above, by the sign $+$, but, in this case, a significant value for the active and reactive powers only appears at the end of a full number of period of the network.

Seeing that the various computations necessary to perform the method described above for the successive straight lines determining the characteristic image point of the section to be protected must be done very quickly, and hence in a computer, it is obviously necessary that the nine electric magnitudes, taken as described with reference to FIG. 2, must be transmitted to said computer in a manner that it can assimilate. To this end, the invention provides an equipment for carrying out the method, this equipment making possible to measure said magnitudes and to transfer data arising therefrom, from a power network of eventually a very high voltage that may be of about the megavolt.

Figure 7:
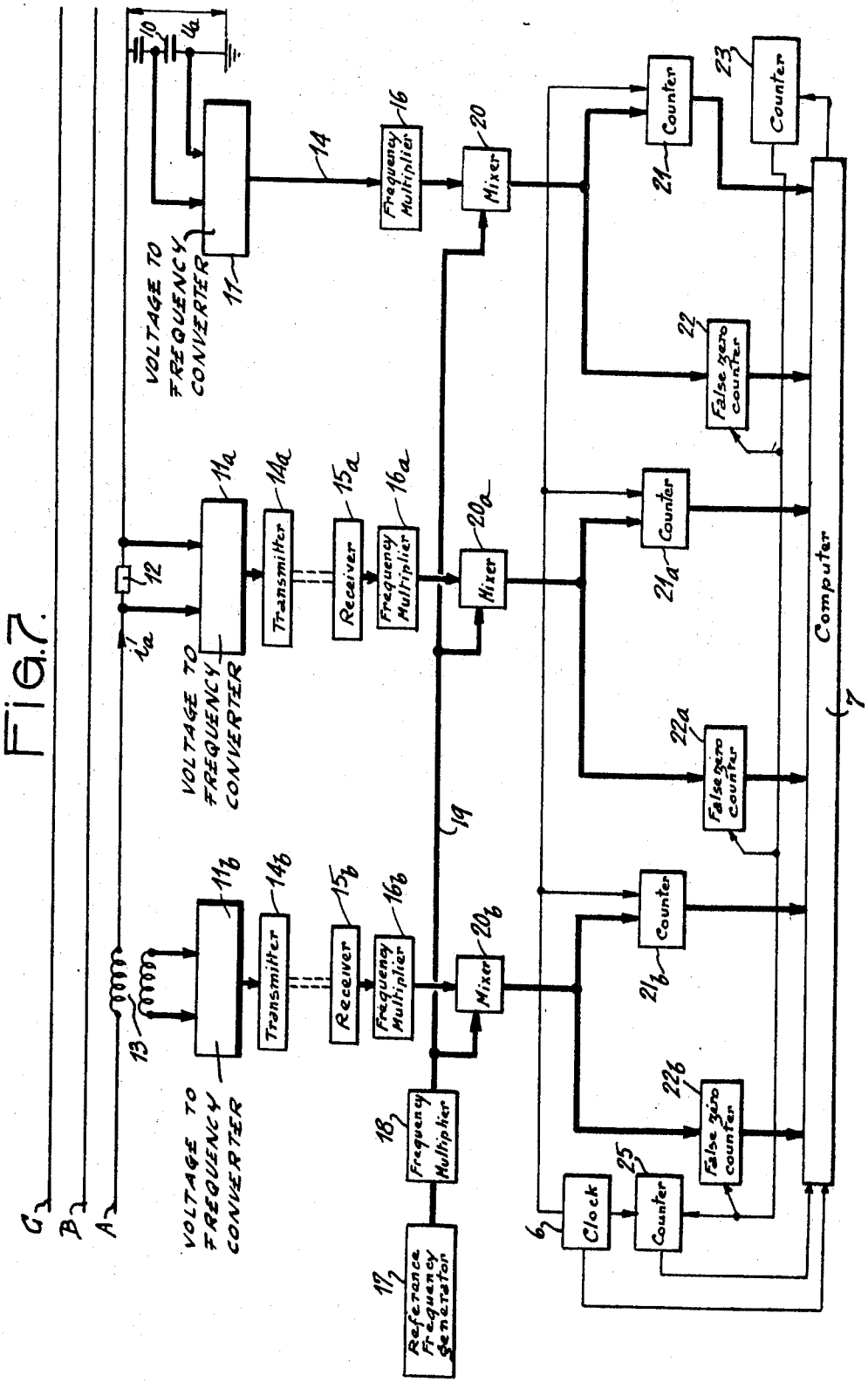
FIG. 7 is a block circuit diagram of a first embodiment of a device for performing the method of the invention.

A first method of carrying out this device is shown in FIG. 7 in a block circuit manner. The members shown on said FIG. 7 are only concerning phase A of the protected section, seeing that these members are identical with regard to the two other phases B and C. The voltage $u_a$ is not directly taken, but through a capacitive divider 10 formed by a battery of condensers in series branched between phase A and the earth. The voltage supplied by the divider 10 is obviously proportional to $u_a$ and is applied to the input of a voltage-to-frequency converter 11 which consequently produces a frequency directly modulated as a function of the voltage variations $u_a$.

In like manner, a voltage-to-frequency converter $11a$ is connected to the terminals of a shunt 12, so that a proportional voltage to the current $i_a$ is applied to it.

Also, a third voltage-to-frequency converter $11b$ is connected to the conductor of phase A by means of a transformer without iron 13 whose primary is traversed by the current of phase A, so that a proportional voltage to the derivative of the current is thus applied to the input of the converter $11b$.

The converters $11a$ and $11b$ which are at the potential of the line, contrarily to the converter 11 which is fed by the capacitive divider 10 necessitates transmission of the data coming from the converters $11a$, $11b$ in an indirect manner. To this end, transmission members $14a$ and $14b$ are respectively associated with said converters $11a$, $11b$ for transmitting data to the receiving devices $15a$ and $15b$, either by hertzian way or preferably optic way.

It is essential that the conversion achieved between the voltages received by the converters 11, $11a$, $11b$ and the frequency that they transmit has a very good linearity but that this frequency be, nevertheless, as high as possible.

In the present state of the technique, voltage-to-frequency converters have only an acceptable linearity up to about 100 mc./s. For data coming from said converters remaining in a zone for which conversion is not criticizable, said converters are, for instance, regulated on a frequency of 80 mc./s., with a possibility of excursion of ±1 mc./s. It is apparent that the exploration area of 2 mc./s. above, was, however, insufficient for obtaining great sensitiveness of measurement. Actually, if we consider that the instantaneous value of the current carried by the line may reach in case of a fault ±100,000 amperes taking into account the exponential transitory component then the frequency excursion of 2 mc./s. corresponds only to one pulse per 40 amperes during 1.25 milliseconds. To obviate this inherent disadvantage to present technique, the pulses are applied to frequency multipliers 16, 16a and 16b. With regard to the converter 11, this transmission is effected directly by a conductor 14, whereas with regard to the converters 11a, 11b, transmission takes place, as explained, by devices 14a, 15a and 14b, 15b.

By selecting, for instance, a multiplication equal to 10 of the frequency of the pulses received from converters 11a, 11b, then the sensitiveness of measurements can become sufficient. Actually, the frequency excursion is then multiplied by 10 and the magnitude variations: $u_a$, $i_a$ and $di_a/dt$ can be expressed by the frequency variations comprised between 0 and 20 mc./s. As example, the frequency multipliers 16, 16a, 16b have an excursion zone comprised between 790 and 810 mc./s.

The high frequencies obtained at the output of the multipliers 16, 16a, 16b being usable with difficulty, a reference frequency generator 17 is provided, which is unique for the whole of the device, i.e., both for the members belonging to phase A as well as the other phases. This generator 17 produces, for instance, a frequency equal to 78.5 mc./s. and this frequency is then multiplied by 10 in a frequency multiplier 18 to obtain a frequency of 785 mc./s. The fixed frequency coming from the frequency multiplier 18 is thus less than the minimal frequency of the signals coming from the frequency multipliers 16, 16a, 16b. Said frequency coming from the multiplier 18 could obviously be different from that mentioned, and for instance, greater than the maximal frequency of the signals able to come from the multipliers 16, 16a, 16b. The reference frequency of 785 mc./s. is applied, by a common link 19, to mixing members or mixers 20, 20a, 20b to which are also applied the signals coming from the frequency multipliers 16, 16a, 16b. In this way we obtain, at the output of the mixing members 20, 20a, 20b signals whose frequency is the difference between the frequency of the signals coming respectively from the multipliers 16, 16a, 16b and the fixed reference frequency from the frequency multiplier 18. In other words, we thus obtain that the excursion zone of 20 mc./s. is retained although the frequency of the signals at the output of the mixing members 20, 20a, 20b is low and comprised between 5 and 25 mc./s. The choice of the frequency of the reference generator 17 is determined as explained in the foregoing, so that in no case can this reference frequency be equal to one of the frequencies of the figurative pulses of the magnitudes $u_a$, $i_a$ and $di_a/dt$.

Figure 5:
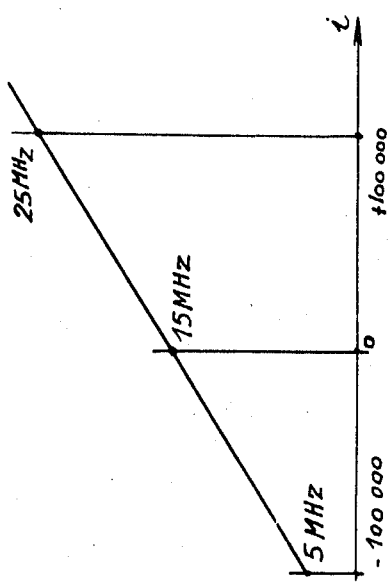
FIG. 5 is an explanatory curve of one of the operations carried out in the execution of the method of the invention.

By the arrangement described in the foregoing, and in considering, for instance, that the intensity $i_a$ may vary between −100,000 and +100,000 amperes, the frequency of the signals at the output of the mixing members passes linearly from 5 mc./s. for −100,000 amperes to 25 mc./s. for +100,000 amperes, as shown in FIG. 5.

As shown by the drawing, the signals coming from the mixing members 20, 20a, 20b are transmitted to counters 21, 21a, 21b. These counters do not operate continuously. Actually, they are piloted by the clock 6 already described with reference to FIG. 2 and which has the effect of making said counters 21, 21a, 21b, active, as well as those belonging to the other two phases, only during integrating time $\theta'$ separated one from the other by $\theta−\theta'$ times. In fact, it is said counters 21, 21a, 21b which play the part of the switches 5 of FIG. 2.

The above-mentioned counters metering during the $\theta'$ time, the number of pulses coming from the mixing members 20, 20a, 20b and the number of pulses outputting from these mixing members being proportional to the magnitudes $u_a$, $i_a$ and $di_a/dt_a$, 21b supply to the computer 7, eventually by distribution logics, numerical data corresponding to the mean value of the electric magnitudes above during the $\theta'$ time. Consequently, the computer 7 to which the three electric magnitudes $u$, $i$ and $di/dt$ relating to each phase A, B, C are supplied is then able to effect the operations described in the foregoing for drawing every $\theta$ seconds the straight lines corresponding to the compound voltages $u_{ab}$, $u_{bc}$ and $u_{ca}$, on the one hand, and to appraise the magnitude of the eventual homopolar components, on the other, which corresponds to the state called "watching" when the network is under normal conditions.

Under normal conditions, the mean value respectively of the voltage, the current intensity and the derivative of an alternating current is obviously nil during an entire number of periods. It results therefrom that the number of pulses numbered during an entire number of periods, for example 512, corresponds, in the linear relation between the measured magnitude and the frequency (see FIG. 5), to the nil value of said magnitude; the number of corresponding pulses is called "-false-zero."

To measure said false-zero, a second set of counters 22, 22a, 22b is provided which are connected, like those of the counters 21, 21a, 21b and for each phase at the output of the mixing members 20, 20a, 20b. The counters 22, 22a, 22b are piloted from a reference meter 23 which is itself piloted by the computer 7 fed with alternating current of the same frequency as that circulating in the section to be protected, so that said reference counter 23 counts an entire number of periods of the line during $\tau$ time which may, for example, be in the region of 10 seconds. In the example considered in that which follows, $\tau$=10.24 seconds, i.e., 512 periods.

To eliminate all risk of error, and thus that the mean values of voltage, current intensity or derivative thereof, when measured during the $\tau$ time are really nil, the beginning and end of each of the successive $\tau$ durations corresponds to the zero passage in the increasing direction of those of the magnitudes measured.

The number of $\theta$ timelags per period being an entire number, it follows that $\tau=P\theta$. This number $P\theta$ is metered in a counter 25 also piloted, as shown in FIG. 7, by the reference meter 23. Actually, the counter 25 is connected to the clock 6 which determines the time intervals $\theta$ and $\theta'$, of which the computer is also informed by the links which exist between it and the clock 6 as well as the counter 25.

When the counters 22, 22a, 22b are open during the time $\tau$, they count an $n$ number of pulses corresponding to the integration during this time $\tau$ respectively of the magnitudes $u$, $i$ and $di/dt$ of each phase previously transformed into pulses as explained in the foregoing. This number of pulses determines the false-zero as hereinbefore defined. So that this measurement defining the false-zero should be utilizable, the number of pulses defining this false-zero considered for the time $\tau$ must be brought to the duration of the integrating interval $\theta'$ during which the counting takes place of the pulses in the counters 21, 21a, 21b. Hence, if during the time $\tau$ seconds = $P\theta$, there is a total of $n$ pulses accounted for in each counter 22, 22a, 22b, during one second it is necessary to consider $\tau$ times less, being:

$$n/\tau=n/P\theta$$

and during the sampling interval milliseconds $\theta'$, $\theta'$ times more, being:

$$n/P\theta\theta'$$

The computer being informed of the terms of this relation by the counter 25 and clock 6, and the number $n$ of pulses during the duration $\tau$ being fed to it by the counters 22, 22a, 22b, said computer makes the computation of said relation (10) and deducts its result from the numerical indication respectively supplied by the counters 21, 21a and 21b.

In actual practice, the values coming from the relation (10) belonging to each false-zero counters 22, 22a, 22b are retained in a memory at least during a time of $\tau+T$ duration to act as reference false-zero to each $\theta'$ integrating made during the following $\tau=T$ duration, and the determining of image points I is obviously effected by taking account of the value corrected of each information transmitted at each integrating interval. Moreover, in order to avoid any error on the determination of each false-zero, particularly during transitory operations that occur in the case of a fault on the line section to be protected, the computer is advantageously programmed so that one only transfers to this computer the data of the false-zero counters 22, 22a, 22b unless, during the feeding of these counters, the computer does not detect any fault. In the case of a fault, on the contrary, the computer is programmed so as not to bring its memories of false-zero up to date and to continue utilizing the false-zeros computed prior to the fault, which false-zeros, because of the slowness of drifts, remain valid and can be utilized again upon returning to normal conditions.

Figure 3A:
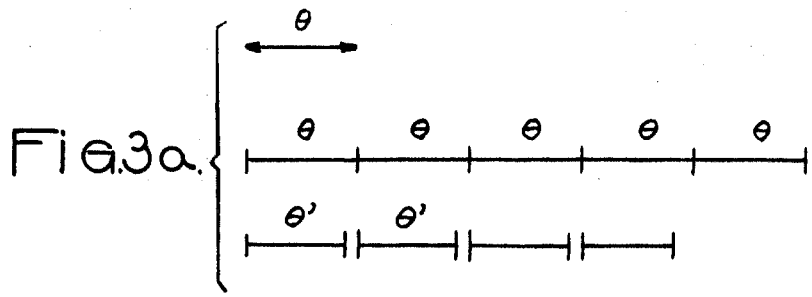
FIGS. 3a and 3b are explanatory diagrams showing a development of the invention.
Figure 3B:
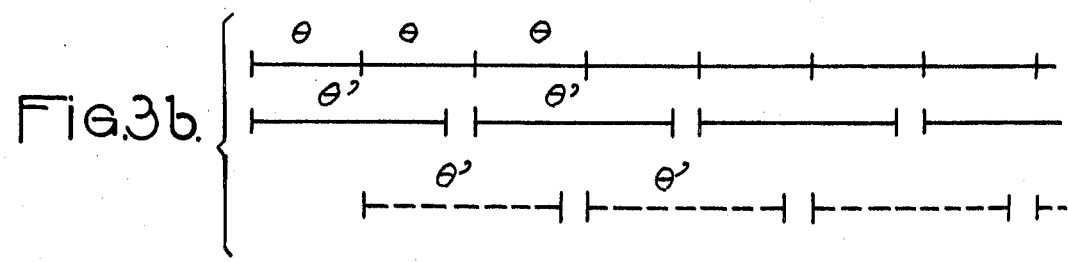
Figure 8:
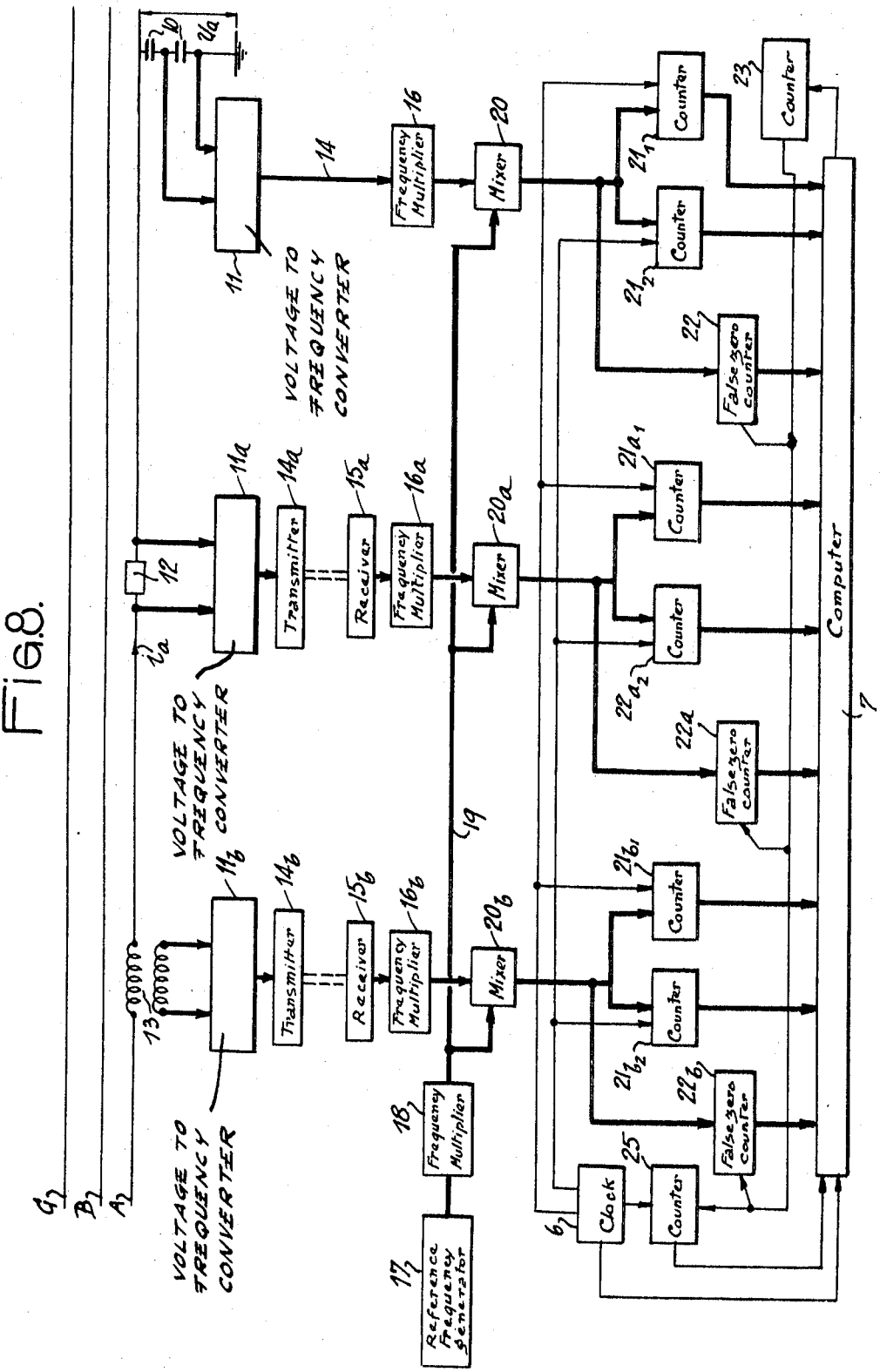
FIG. 8 is a diagram similar to FIG. 7 showing a slight alternative embodiment.

FIG. 8 shows the modification to be made to the device when it is desired to have $\theta'$ integrating intervals every two $\theta$ as described with reference to FIG. 3a. In this case, the same members are used as those described with reference to FIG. 7, and consequently, these same members have the same reference numerals. On the other hand, there is used for each electric magnitude $u$, $i$, $di/dt$, respectively, two counters $21_1$, $21_2$; $21a_1$, $21a_2$ and $21b_1$, $21b_2$ which are alternately piloted by the clock 6 which provides data enabling the opening, in turn, of each of the two counters belonging to each magnitude during the staggered $\theta'$ time of the time $2\ \theta-\theta'$. All the other members of the device remain identical and its working is consequently the same.

Although the various members intended to the measuring of the electric magnitudes, their transmission and transformation for being assimilable by the computer, may be made in various manners belonging to the technique of electronics, the invention provides a preferred method of embodiment for each of these members.

Figure 9:
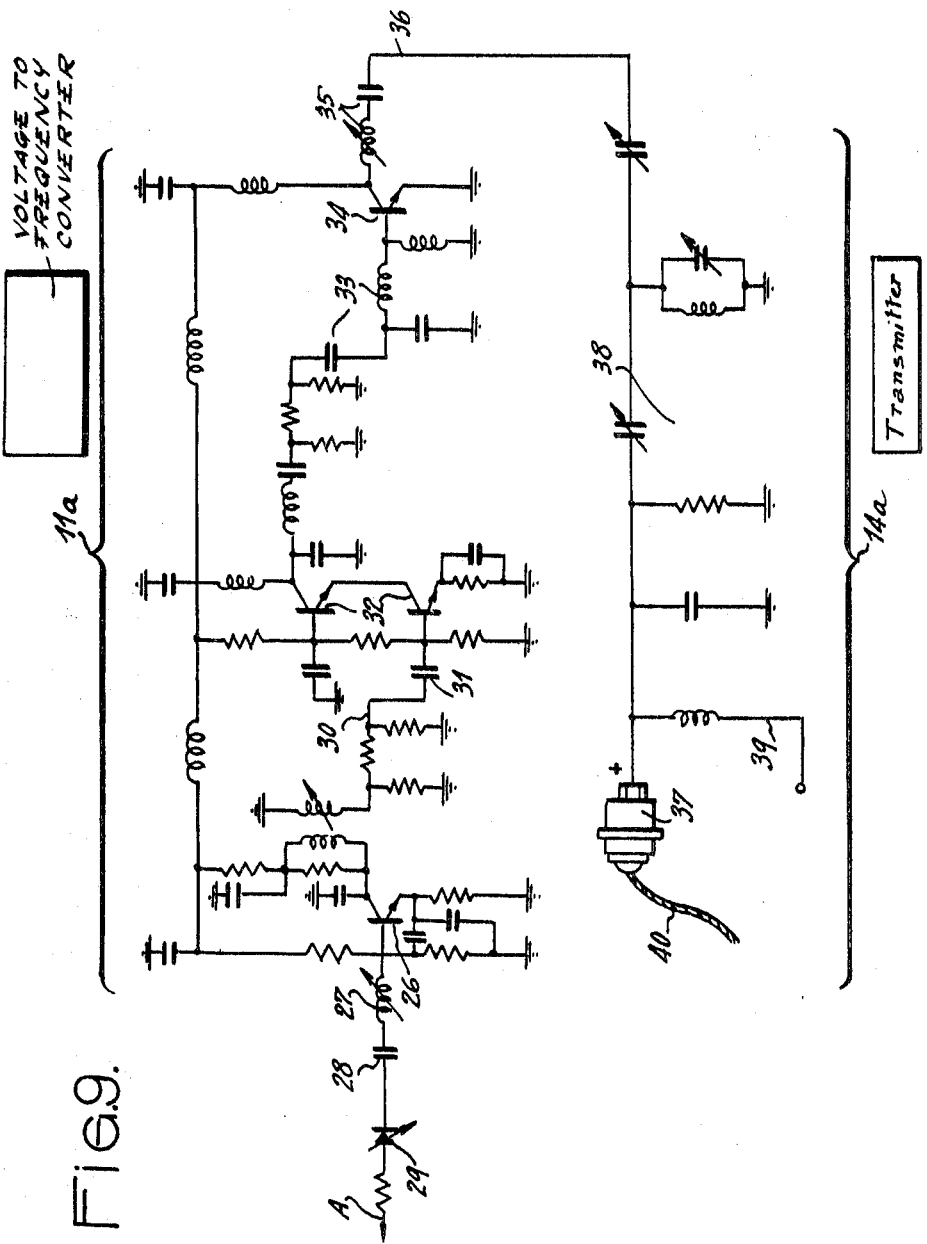
FIGS. 9 to 13 are circuit diagrams showing preferred constructions of the various parts of the equipment according to the block circuit diagram of FIGS. 7 or 8.

FIG. 9 shows the embodiment of voltage-to-frequency converters 11, 11a, 11b. These converters comprise at least a transistor 25 mounted as an oscillator and the base of this transistor is controlled by a tuning coil 27 and a coupling condenser 28 from a variable capacity diode 29, called in the technique, Varicap or Varactor, the input A of the diode being connected, for instance, to the terminals of the capacitative divider 10 or the shunt 12, or the transformer 13 of FIG. 7. The oscillator described above issues, at its output, designated by 30, signals whose frequency is comprised, in the example considered, between 79 and 80 mc./s. and these signals are applied, by means of a condenser 31, locking the continuous components, at the input of a first two-transistor amplifier 32, mounted, for instance, in a connection to a common emitter, this amplifier being itself connected, by a filtering circuit 33, to the base of a power transistor 34 whose collector is connected, by a self-capacity connection 35, to an output conductor 36. The output conductor 36 of the converter 11 is connected to the conductor 14 leading directly to a frequency multiplier. On the contrary, with regard to the converters 11a, 11b which are in the potential of the network, said output conductor 36 is connected to the transmission members 14a or 14b.

Preferably, according to the invention, as transmission member use is constituted of an optical device made by a photoluminescent diode 37 which receives the pulses, suitably amplified, by means of an adaptation circuit designated as a whole by 38 and which is made in a known manner inductance coil and capacity elements, a resistance adapting the impedance of the input circuit to that of the photoluminescent diode 37. This diode also comprises a polarization circuit 39.

By way of example, the photoluminescent diode can transmit on a wavelength of 0.9 $\mu$ and the luminous beam that it produces is a beam, which, while considering preceding examples, is a sinusoidal beam modulated at 80 mc./s. The output power of the power amplifier formed by the transistor 34 is, for example, in the region of 300mw.

The transmission member 14a can obviously be replaced by an equivalent device, for instance, by a Hertzian transmitter.

Figure 10:
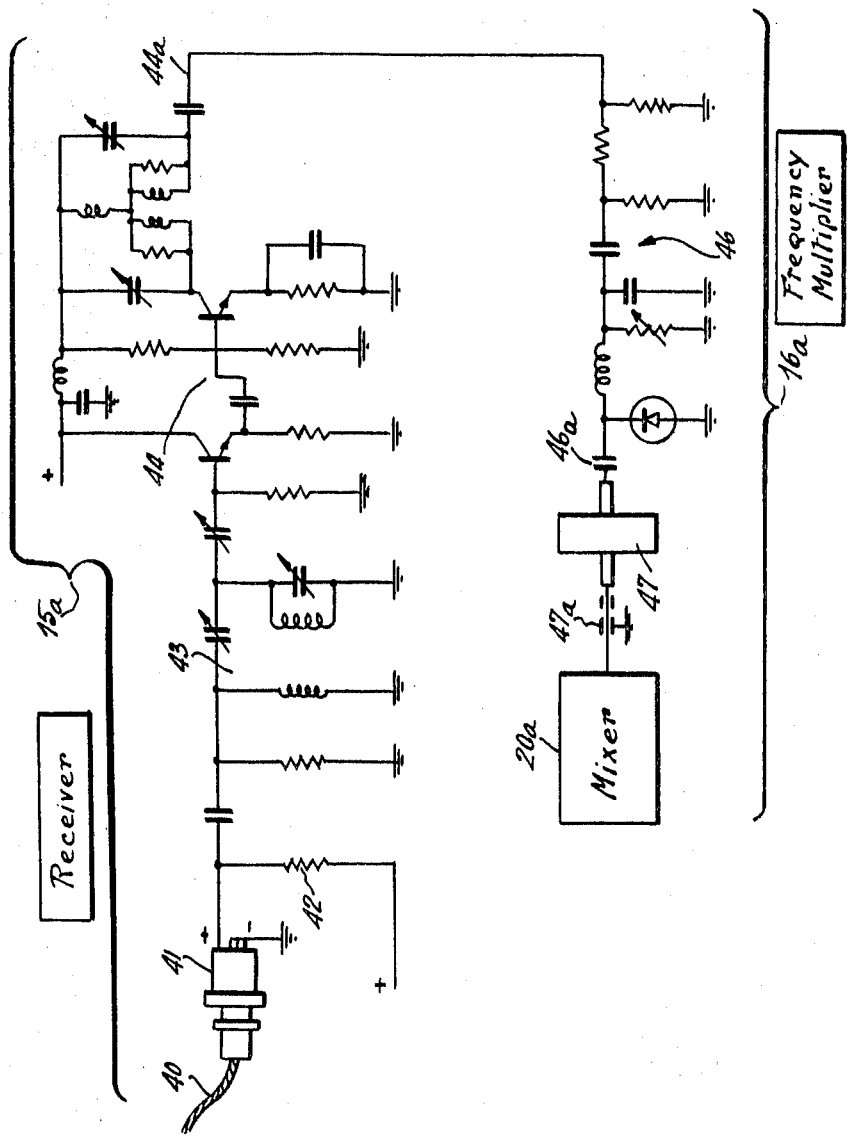

The modulated luminous beam transmitted by the diode 37 is transmitted by glass fibers 40 connecting the diode 37 to a receiving photodiode 41 (FIG. 10) which forms the input member of each of the receiving devices 15, 15a or 15b. The receiving diode 41 is fed by a polarization circuit 42 and issues through an impedance adaptation filter designated as a whole by 43, which raises the impedance, for instance, to 50 ohms. The electric power issued by the diode 41 being low, there is provided at the output of the impedance adaptation filter 43, a transistorized amplifier designated as a whole by 44. This amplifier is made in the form of a high frequency amplifier whose components are calculated so that the transmission band is at least 2 mc./s., but preferably greater, and in the region of 4 mc./s., so that it has, in the zone utilized of 2 mc./s., as perfect a linearity as possible. Actually, as explained in the foregoing, frequencies varying between 79 and 81 mc./s. must be transmitted in as lineary a manner as possible up to a frequency multiplier, such as 16a, also shown in FIG. 10 whose input is directly connected to the output 44a of said amplifier 44. The output power of the amplifier 44 is generally in the region of 1 w. and this amplifier causes a stepped-up diode 45 to oscillate, by means of an impedance adaption filter designated as a whole by 46. The stepped-up diode 45 produces, as is known, harmonics of the fundamental frequency made by the frequency of impulses coming from the amplifier 44.

As shown by the drawing, a condenser 46a is provided at the output of the stepped-up diode 45 eliminating all continued components and a selection filter 47 having the effect of eliminating, both the fundan... ...al as well as all the harmonics with the exception of the harmonic 10, so that at the output 47a of the filter 47 we obtain a frequency of 800 ±10 mc./s. which is applied to the mixing member, in this case, the mixer 20a.

Figure 11:
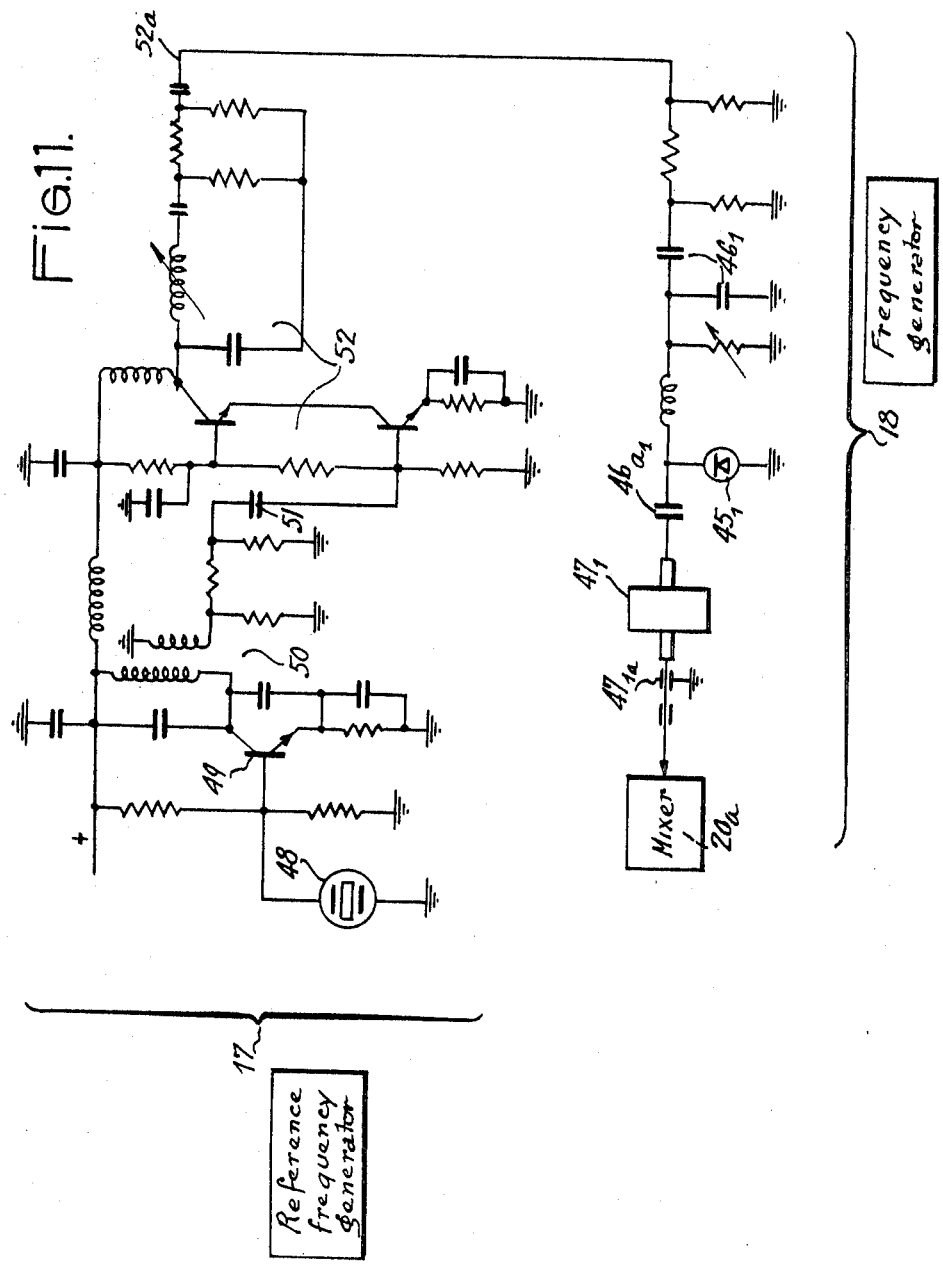

The reference frequency generator producing the fixed frequency of 78.5 mc./s. is made as shown in FIG. 11, and comprises a piezoelectric generator 48, formed by a crystal so arranged as to pilot the base of the transistor 49 mounted as an oscillator in combination with an oscillator circuit designated on the whole by 50. The output of the oscillator circuit 50 is connected by a coupling condenser 51, eliminating eventual direct components, at the input of a transistorized amplifier 52 supplying, as well as the amplifier 44 of FIG. 10, at its output 52a, a power of about 1 w. The drawing shows that the reference oscillator 17 is connected to the frequency multiplier 18 which is in exactly the same manner as described above with reference to the frequency multiplier 16a, and hence, the members of said frequency multiplier 18 are designated by the same reference numerals as in FIG. 10, to which the index 1 is added. The output $47_1a$ of the frequency multiplier 18 which produces a frequency of 785 mc./s., is connected, by a conductor to all the mixers such as 20, 20a, 20b of each phase.

Figure 12:
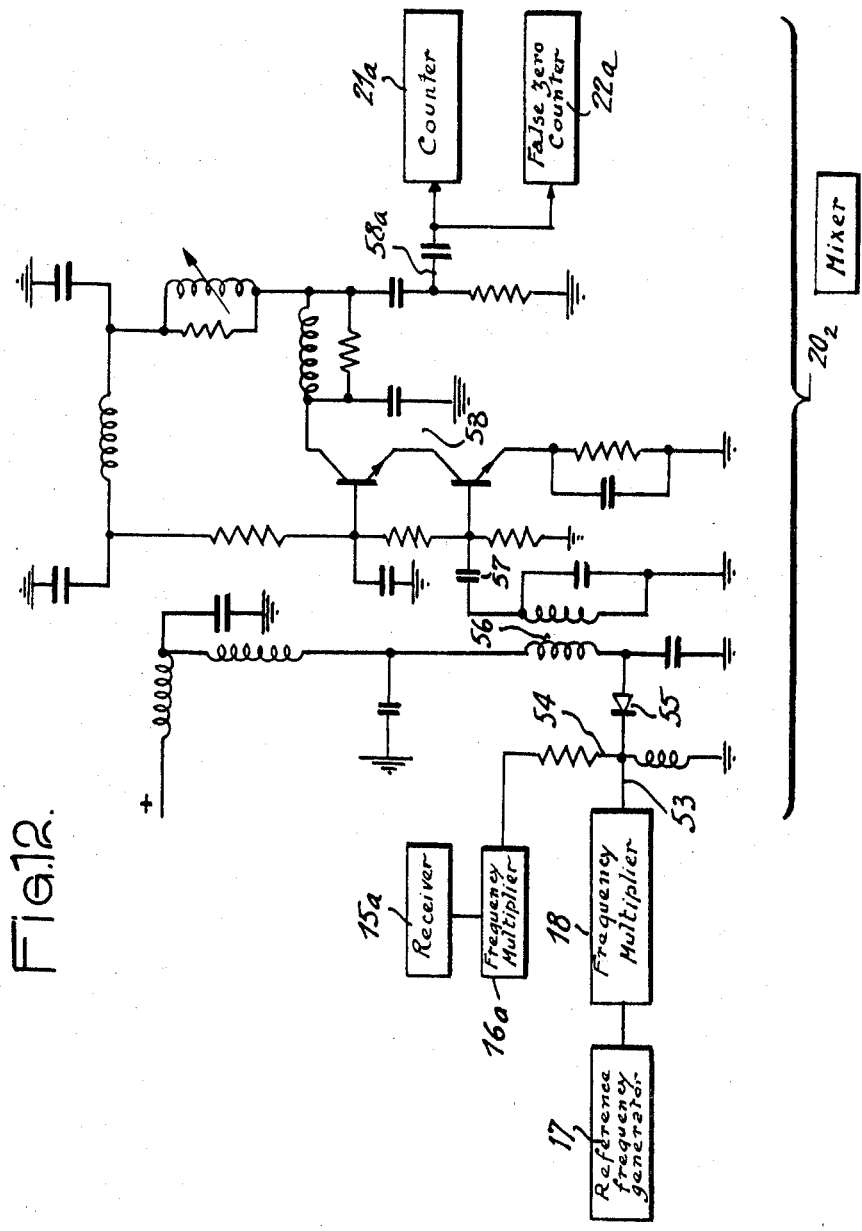

FIG. 12 shows how said mixers are made. The reference frequency coming from the generator 17 and the frequency multiplier 18, as well as the modulated frequency coming from one of the receivers, for instance, the receiver 15a, after multiplying in the multiplier 16a, are respectively applied by conductors 53, 54 to the input of the mixer diode 55 whose output is connected to a filter 56 tuned so as only to allow frequencies to pass comprised between 5 and 25 mc./s., i.e. the difference between the frequencies respectively received from the multiplier 18 and the multiplier 16a or its homologues. The frequency coming from the filter 56 is applied, by a coupling condenser 57, to the input of a transistorized amplifier 58 whose output 58a is connected to counter 21a and a false-zero counter 22a, if we refer to the embodiment described with reference to FIG. 7, or else both counters $21a_1$, $21a_2$ and to the false-zero counter 22a, if one refers to the embodiment of FIG. 8.

The pulses counters being commercial apparatuses of which a large number of models exist, it has not been considered necessary to describe a particular embodiment of it.

Figure 13:
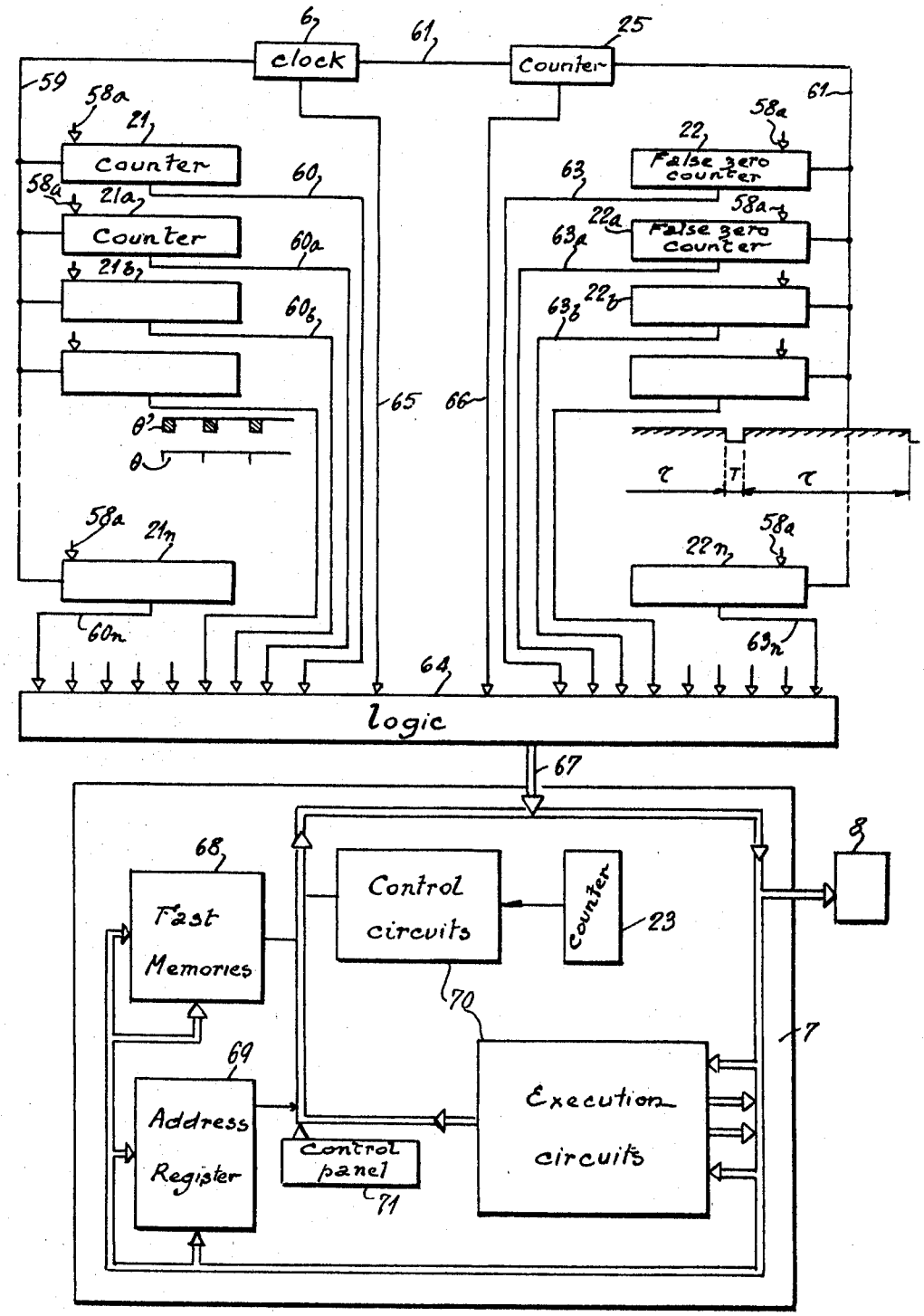

As shown in FIG. 13, the counters 21, 21a, 21b,...21n belonging to the three electric magnitudes of each phase, and, if so required, a second group of identical counters, if one refers to the method of embodiment of FIG. 8, receive, by the conductor 58a of their associated mixers, the representative pulses of said electric magnitudes. These counters, which are piloted by the clock 6 from a control conductor 59, supply numerical indications and these are fed by conductors 60, 60a........60n in a distribution logic 64 forming part of the computer 7, or preferably, forming a peripheric element to said computer. In like manner, the pulses brought by the same conductors 58a coming from the mixers belonging to each electric magnitude of each phase, are brought to the false-zero counters 22, 22a, ....22n which are piloted from the counter 25, itself piloted by the clock 6 through a conductor 61. The piloting of the false-zero counters is effected by a common conductor 62 and conductors 63, 63a.....63n connecting each false-zero counter to the distribution logic 64, so that the number of pulses counted during the $\tau$ times are transferred to the distribution logic 64 during time intervals T corresponding to a current period.

In the numerical example chosen for which the $\tau$ time corresponds to 10.24 seconds, the $\tau$ time corresponds to 8,192 $\theta$. The times metered by the clock 6 as well as those whose sum is made by the counter 25, are entered by conductors respectively 65 and 66, in the distribution logic, also for coding. The output of the distribution logic 64 is connected to the input multiplex channel 67 of the computer 7. This computer can be of various origins. Preferably, however, a computer of the "Compagnie des Compteurs" is used, known under the reference "PAC 700," which likewise comprises other known computers memory registers 68, address registers 69 and various control and execution circuits 70. The counter 23, for metering the frequency of the network is, for instance, integrated as shown, inside the computer and the programming of the said computer is effected from a control panel 71.

The programming of the computer is such that in a watching period, during each sampling interval, said computer controls on one hand the lack of significant homopolar component by using the equations (6), on the other hand the lack of faults between phases, situated in the section to be supervised by using the equations (4).

If there appears the possibility of a fault between phases, the computer proceeds to its localization by using the other appropriate criterium hereinbefore defined by deferring the computations relating to the phase-to-ground defects, on the contrary if there appears a significant homopolar component, not together with a fault between phases, the computer proceeds to the determination of the algebraic distance of the fault in the aforesaid condition.

Figure 14:
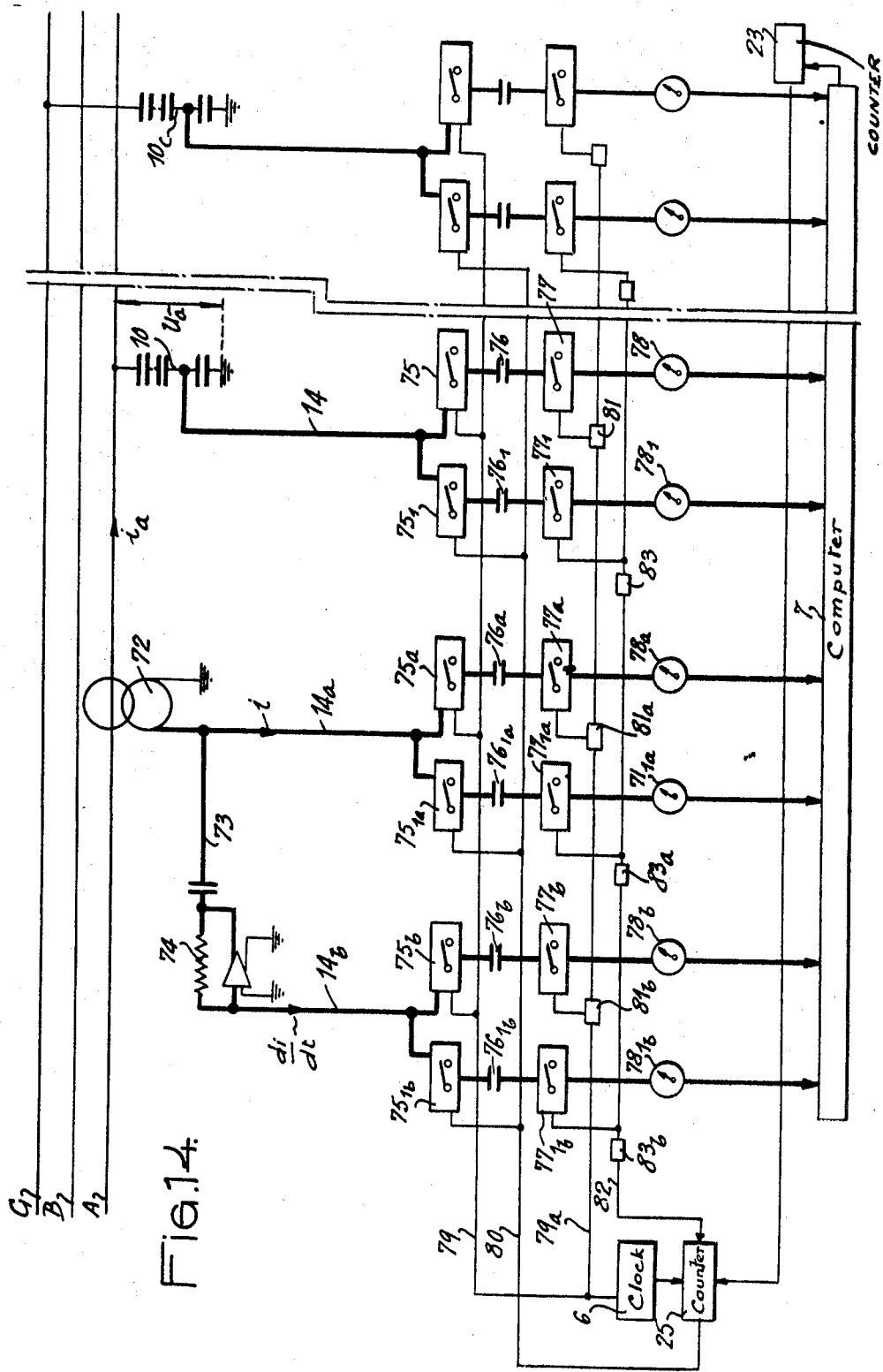
FIG. 14 is a block circuit diagram illustrating an embodiment alternative of the equipment of FIG. 7.

FIG. 14 shows an alternative embodiment of the device according to which one provides, as previously mentioned, a capacitive divider 10 for metering voltages, for instance, the voltage $u_a$ of the phase A conductor, and likewise, obviously, identical capacitive dividers for the other phase conductors, for instance, as shown on the right side of the figure, a divider 10c for phase C. The current intensities circulating in the phase conductors are determined at the terminals of an intensity transformer 72, which, in actual practice, is made up of several transformers mounted in tandem so that meterings required for ensuring the insulating of the various transformers is not too costly when metering the intensity circulating in very high tension networks in a region of the megavolt. The secondary winding of the transformer 72 is connected by a conductor 73 to a derivating circuit 74 enabling to set up the derivative $di/dt$ of the current circulating in said secondary of the transformer 72.

The conductor 14 coming from the voltage divider 10 is connected to a set of two switches 75, 75$_1$, and in a similar manner, a conductor 14a coming from the secondary of the transformer 72 is connected to a set of switches 75a, 75$_{1a}$ whereas the conductor 14b coming from the derivating circuit 74 is connected in like manner to a set of switches 75b, 75$_{1b}$.

The switches described above, as well as those belonging to the other two phases, and which are formed by electronic circuits, are respectively connected to capacitors 76, 76$_1$; 76a, 76$_{1a}$; 76b and 76$_{1b}$ connected, on the one hand, to a second group of switches designated by the references 77 to 77$_{1b}$. These second switches are respectively connected to one or many coding voltmeters 78, 78$_1$ ........78$_{1b}$ connected, on the other hand, to the computer 7 comprising the distribution logic device 64 described with reference to FIG. 13.

The switches 75, 75a, 75b are connected to the clock 6 determining the times $\theta'$ and $\theta$ by a common control cable 69 and this applies with regard to the switches 75$_1$, 75$_{1a}$ and 75$_{1b}$ which are connected by a control cable 80 to said clock 6. The cable 79 coming from the clock 6 also acts for controlling the switches 77, 77a and 77b, but by means of delay circuits 81, 81a, 81b. The clock 6 is connected as previously to the counter 25 for time intervals $\theta$ and $\theta'$. The counter 25, as in the previous example, is itself piloted by the reference counter 23 metering the times $\tau$ and T. A cable 82 acts for controlling switches 77$_1$, 77$_{1a}$ and 77$_{1b}$, by means of delay circuits 83, 83a and 83b, the circuit 83b if required being able to be suppressed.

Seeing that the clock 6 defines sampling intervals $\theta$ and integrating intervals $\theta'$, in a first cycle, said clock 6 closes the switches 75, 75a during the integrating time $\theta'$. In this manner, the electric magnitudes $u$, $i$ and $di/dt$ are integrated by the capacitors 76, 76a.......etc. The clock 6 then keeps the switches 75, 75a, ......open, during the rest of the time interval $\theta$. On the other hand, the cable 79a, connected to the cable 79, also transmits information during the time $\theta$. This information is delayed by delay devices 81b, 81a and 81, as well as by those concerning the other phases, of successive times less than $\theta - \theta'/9$. This is shown in FIG. 15 which shows at $\theta'$ the integrating instant during which all the capacitors 76, 76a..... are simultaneously charged, while these capacitors are then successively discharged as shown by the arrows of the reference numerals 77b, 77a, 77.... The clock 6 working cyclically, the same operations are thus repeated for each timelag $\theta$.

The quantity of power stored up by the capacitors 76, 76a.... corresponding to the electric magnitudes that they have during the $\theta'$ time, one thus obtains the mean value of these electric magnitudes during said integrating interval, which is determined by coding voltmeters 78, 78a, 78b... which thus transmit data to that transmitted in the previous embodiment by the counter 21, 21a etc. Only one coding voltmeter 78 may be used as the mean values of the electric magnitudes measured are successively discharged.

As in the previous example, it is advisable, if so required, to take accounts of metering errors due to drifts, nonlinearity, etc., particularly of the switches and other members. This is the part played by the switches, 75$_1$, capacitors 76$_1$, switches 77$_1$, and coding voltmeters 78$_1$., all having to their respective indices. Actually, as shown in the drawing, the cable 80 connecting the switches 75$_1$, 75$_{1a}$ ....., is connected through the clock 6 and the counter 25, to the reference counter 23 which counts the periods of the network. Consequently, said switches 75$_1$, 75$_{1a}$, ..... are kept closed during the time $\tau$ and then be opened only during the time T. This is shown in FIG. 16. Consequently, the capacitors 76$_1$, 76$_{1a}$, 76$_{1b}$ integrate the electric magnitudes applied to them during said time $\tau$. Still referring to FIG. 16, one notices that the counter 25 which counts the number of intervals $\theta$ contained in the time $\tau$, causes the switches 77$_{1b}$, 77$_{1a}$, 77$_1$, to close successively in the time interval T corresponding to a period, and this at the same time that the switches 75$_1$, 75$_{1a}$ are open. The successive discharge of the capacitors 76$_{1b}$, 76$_{1a}$,...is metered by the coding voltmeters 78$_{1b}$, 78$_{1a}$, 78$_1$, ... exactly in the same manner as the false-zero counters 22, 22a... of the previous embodiment, and the data of these latter coding voltmeters, which act as false-zero voltmeters, are then interpreted through the distribution logic device computer 7 in the same way as that described.

The preferred method of carrying out the invention being that either of FIG. 7 or FIG. 8, seeing that it uses essentially electronic components having great safety, and whose price is less than that of the highly insulated transformers of FIG. 14, it is advisable to take account of the fact that the voltage-to-frequency converters 11a, 11b and their associated transmission members 14a; 14b, etc., are at the potential of the line. This is why the link between said transmission members and said receiving members 15a, 15b is provided for by indirect means. Seeing that the members that are at the potential of the line must nevertheless be supplied with low-tension electric power in the region of about 10 volts for some of them, and about 30 volts for others, it has seemed advantageous, to eliminate all risk of accidents, to supply said members at the potential of the line from this line itself, so that the whole of the supply can be placed in the same enclosure as that containing the said members at the potential of the line.

Figure 17:
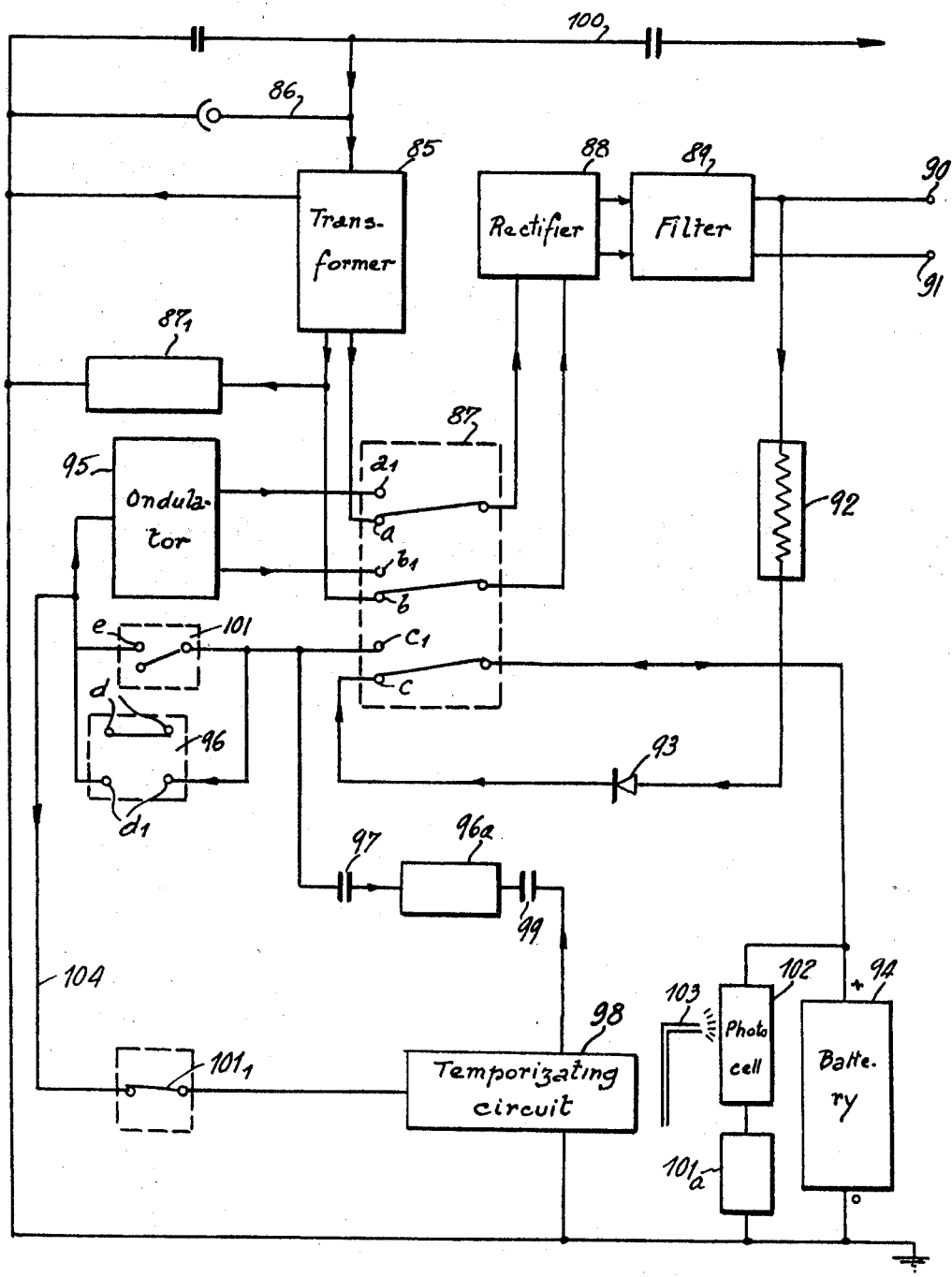
FIG. 17 is a block circuit diagram of an accessory of the device of the invention.

Considering, for instance, the voltage-to-frequency converters and their transmission members, 11a, 11b and 14a as well as their homologues of the other phases, seeing that it is for those devices that the supply is '' most difficult as they are at the potential of the line, one proceeds as follows:

As shown in FIG. 17, one provides a capacitive divider 100 similar to the divider 10 described in the foregoing. This divider feeds the primary winding of a transformer, for instance, with two secondary windings, eventually protected by a spark gap 86. The secondaries of the transformer 85 respectively feed the work contacts a, b of a relay 87 which comprises a third work contact c. The rest contacts of the relay 87 are designated by $a_1$, $b_1$, $c_1$ and the energization coil of this relay by the reference $87_1$, the coil being fed between one of the secondary windings of the transformer 85 and the earth.

The blades of the relay 87 linked with the work contacts a and b, feed rectifiers 88 associated with filtering cells 89 for producing continued voltages respectively to be brought to the terminals 90 and 91. The terminal 90 is connected by a load resistor 92 and a stabilization diode 93 through the third contact c of the relay 87 to an accumulator battery 94, so that said battery 94 is thus always kept in a suitable charging state.

When the voltage of the line drops below a given level, the energization coil $87_1$ can no longer keep the relay in a work position, so that its blades fall on to the contacts $a_1$, $b_1$, $c_1$. In this case, the battery 94 feeds an ondulator 95, through the rest contact $c_1$ and the contacts $d_1$ of a bistable relay 96. The ondulator 95 then feeds, through the rest contacts $a_1$, $b_1$, the rectifiers 88 and filtering cells 89 as previously described. The bistable relay 96 is a relay delayed by a temporizing circuit 98 connected to the energization coil 96a of said bistable relay 96 by a capacity 99. Said relay 96 then ensures a working of limited duration, for example, of 60 seconds, after the lack of voltage on the line.

The working of this relay is as follows: when the rest contact $c_1$ of the relay 87 is connected to the corresponding blade, a current pulse is sent through a capacitor 97 placed upstream from the energization coil 96a of the bistable relay 96. As the contact $c_1$ is closed, the feeding of the capacitor 97 takes place. At the end of the temporization timelag of 60 seconds, the temporization circuit 98 sends a current pulse through the capacitor 99 into the control coil 96a, which causes the opening of the relay 96 whose contacts d are then connected. In this case, the feeding of the ondulator 95, and hence the rectifiers 88 and filtering cells 89 is then interrupted, and consequently, the battery 94 is isolated, so that it runs little or no risk of being discharged.

After having repaired a fault on the line, which has caused after the timelag considered of 60 seconds, the isolation of the supply battery 94, it may be necessary to test the line and thus enable the operating of the detection device assembly before high tension is again applied to said line section. Consequently, it is necessary to make possible the returning into circuit of the battery 94. For this, a relay 101 is provided, in parallel with the bistable relay 96 and which thus makes it possible, when the work contact e of this relay is closed, to feed the ondulator 95 from the rest contact $c_1$ of the relay 87 and thus from the battery 94. The relay 101 is controlled by an energization coil 101a which is permanently connected to the battery 94 by means of a photoresistant cell 102. The photoresistant cell 102 is itself tuned to an optical fiber 103. As can be seen from the foregoing, by lighting up said cell 102 through the optical fiber 103, which ensures insulation between the potential of the line and the earth, the coil 101a is energized for closing the relay 101, so that we again find the working conditions from the battery 94. If the test of the line section gives satisfaction, then said line section is put under voltage, and consequently, the feeding of the coil $87_1$ of the relay 87 causes said relay to close.

So that it will not be necessary to light up the photoresistant cell 102 for a long time, but that only a luminous flash is provided for it, the relay 101 is provided with a second contact $101_1$, which, when said relay 101 is in the rest position, is closed on a conductor 104 branched between the ondulator 95 and the temporizating circuit 98. In this manner, at the moment when the coil 101a is energized to cause the closing on the contact e of the relay 101, the battery 94 is momentarily connected to the temporizating circuit 98 which is thus reset for ensuring maintenance of the supply from the battery during a new timelag, for example of 60 seconds, as described in the foregoing.

Moreover, a solar battery can be supplementarily provided for keeping the battery 94 charged when the network is disconnected; it is also possible of recharge the battery by an electric generator carried along by a turbine to which compressed air is sent by a pipe in a insulating material.

What we claim is:

1. In the method for detecting and localizing faults which occur in a section of a polyphase alternating current line having phases a, b and c, said line having known inductive and ohmic resistances and wherein the magnitudes of direct voltage $u$, current intensity $i$ and derivative $di/dt$ are measured for each phase, the steps for specifically determining faults between phases of:

calculating the following compound magnitudes of voltage and current intensity respectively between each two phases $u_{ab}$, $u_{bc}$, $u_{ca}$ and $i_{ab}$, $i_{bc}$, $i_{ca}$, calculating the following compound inductive voltage drops respectively between each two phases $$1\frac{d(i_a-i_b)}{dt}, 1\frac{d(i_b-i_c)}{dt}, 1\frac{d(i_c-i_a)}{dt}$$

including all nonresistive magnitudes calculating the following compound resistive voltage drops respectively between each two phases $$r(i_a-i_b), r(i_b-i_c), r(i_c-i_a)$$

comparing for each group of two phases the compound voltage with the addition of said compound inductive and resistive voltage drops to which is successively and respectively affected by multiplication coefficients ($x_{ab}$, $y_{ab}$, etc.) whereby said latter voltage drops have an equation having the form of a straight line for each group of two phases:

$$(u_{ab}=x_{ab} v_{ab}+y_{ab} w_{ab}, u_{bc}=... \text{etc.})$$

recording data of said equations, repeating the foregoing steps at regular intervals of time different from a full number of periods of the alternating current whereby there is obtained for each group of two phases equations of successive straight intersecting lines which are all concurrent to a same point having in a plane the coordinates of which are determined by said multiplication coefficient, an ordinate which corresponds to the distance of the fault with respect to the length of said line section, and switching off said line section in the event that said ordinate reaches a predetermined value:

and the steps for specifically determining faults between any one phase and earth of:

separately adding the current of each phase and the derivatives thereof, recording the last result of said addition, comparing said additions respectively with the previously recorded one, switching off said line section in the event that said comparison shows a predetermined ratio whereby there is ascertained that a significant homopolar component occurs:

and the further steps in the presence of a significant homopolar component of:

calculating for each phase and from said direct magnitudes the:

1. homopolar resistive voltage drops ($v_a = r_h i_h$)
2. resultant voltage drops including resistive, inductive and homopolar voltage drops as defined in Ohm's law from which said homopolar resistive voltage drop is eliminated, $$\left[ w_a = r(i_a - i_h) + 1 \frac{d}{dt}(i_a - i_h) + 1_n \frac{di}{dt} h \right]$$
$$[w_b = \ldots \quad ]$$
$$[w_c = \ldots \quad ]$$

affecting by multiplication successively and respectively coefficients ($x_a$, $y_a$) to said homopolar resistive voltage drop and to said resultant voltage drop whereby an equation having the form of a straight line is obtained for each phase including the phase in fault $$[u_a = x_a v_a + y_a w_a]$$
$$[u_b = \ldots \quad ]$$
$$[u_c = \ldots \quad ]$$

recording data of said equations even though no fault occurs, repeating the foregoing steps at regular intervals of time different from a full number of periods of the alternating current for each phase thereby providing for the determination of successive equations of straight lines, and utilizing data recorded just before a significant homopolar component occurs and data obtained just after said homopolar component occurs to determine a point to which cross the straight lines defined by said equations, said point having an ordinate which corresponds to the distance of the fault.

2. Method according to claim 1 comprising the further steps of recording during at least one current period the value of the compound voltages found, substituting said compound voltage values retained in Ohm's law equation with said values of resistive and inductive voltage drops at the instant of determining a fault between phases, drawing up at least one of the corresponding straight lines, repeating the same operations at the moment of the next measurement, so that to draw at least one new straight line, and determining the sign of the ordinate of the intersection point of said two straight lines, this sign being positive when the fault is downstream from the measuring point and negative when said fault is upstream from the measuring point whereby it is determined if the fault between phases occurs in the section of line to be protected.

3. Method according to claim 1 comprising the further steps of using said data relative to homopolar components in an equation corresponding to Ohm's law but limited to said homopolar components ($u_h = r_h i_h l_h \, di_h/dt$), of grouping on the one hand, the components of the resistive homopolar voltage drops affected with a first numerical coefficient and, on the other hand, the inductive homopolar voltage drops affected with a second numerical coefficient to form the equation of a straight line ($u_h = x_h v_h + y_h w_h$) with the corresponding voltage homopolar component repeating the same operations at the following interval of time so that said two straight lines concur at a fictitious image point whose ordinate appears positive when the fault is upstream from the measuring point and negative when said fault is downstream whereby it is determined if the fault between a phase and earth occurs in the section of line to be protected.

4. Method according to claim 1 comprising the further steps of memorizing at least the value of the data obtained during a measure under the normal conditions of the line, recording new data during a subsequent measure whereby is obtained the equation of two straight lines at two successive measuring intervals, computing the abscissa and ordinate of the point at which the two straight lines concur, said abscissa and ordinate occurring in the form of two ratios, calculating separately the respective numerators of two ratios, and recording from computation of said two numerators, for the successive measuring intervals position of successive points whereby two curves are determined, one of said curves corresponding to the numerator of the abscissa being a representation of the active power and said curve corresponding to the ordinate being a representation of the reactive power circulating in the line section.

5. Method as set forth in claim 1, comprising for the measure of said electric direct magnitudes the steps of: measuring for each phase voltages corresponding respectively to said voltage, current intensity and derivative thereof during a predetermined sample time smaller than said interval of time separating two measures, repeating said measuring a full number of times per period of the AC whereby mean values for said direct magnitude are successively obtained, changing said mean values into pulses, computing said respective number of pulses during said sample time and coding subsequently the same whereby data are obtained and usable in a computer.

6. Method as set forth in claim 5 comprising the further steps of computing said pulses during an entire or full number of periods of said AC determining if said number is nil or not, and in case said number is not nil of computing the number of pulses thus obtained for a time corresponding to said sample time whereby is obtained a false-zero value, and algebraically subtracting the number of pulses corresponding to said false-zero value from the number of pulses corresponding to each one of said electric magnitudes whereby errors of measurement are eliminated.

7. Device for detecting and localizing faults on a section of lines transporting polyphase alternating current comprising, for each phase conductor, means for measuring voltage between this phase conductor and earth, means for measuring current intensity circulating in said phase conductor, and means measuring derivative of said current intensity, at least one switching member connected to each of said measuring means at the output thereof, recording elements selectively connected to said switching members whereby said voltage, current intensity and derivative thereof are recorded during closing of said switching members, a driving clock unit having constant operating cycle and producing at least one operative signal of constant duration or integrating time during said operating cycle, the duration thereof being different from a full number of cycles of said AC members operatively connected to said switching members and to said clock unit end operated simultaneously during said operating signal thus causing recording of said voltage, current intensity and derivative thereof during said operative signal, a computer connected to said recording elements, whereby said voltage, current intensity and derivative thereof taken during said integrating time are supplied to said computer causing treatment thereof according to Ohm's law equations having terms affected by said computer with coefficients whereby said Ohm's law equations have the form of straight lines successively rotated to an extent corresponding to said cycle of said clock unit, successive rotated straight lines being concurrent to a single point characteristic of the existence of a fault, and switching-off means for said phase conductors of said section of lines and operated by said computer in dependency with the position of said single point.

8. Device according to claim 7, characterized in that it comprises at least two switching elements connected to each measuring member and at least one recording element belonging to each switching element, said clock unit successively closing said two switching elements during integrating times equal between them respectively separated by time intervals also equal between them.

9. Device according to claim 7 in which said means for measuring the voltage of each phase conductor are connected to their respective conductor by a voltage divider, said means for measuring said current intensity are connected to their respective phase conductor by a shunt and said means measuring the derivative of the current are connected to their phase conductor by a transformer without iron, said means being all constituted by voltage-to-frequency converters, so that pulses modulated accordingly to the value of said voltage, current intensity, and derivative thereof are produced, a frequency-multiplying device being connected to each of said voltage-to-frequency converters and said frequency multipliers being, moreover respectively connected to mixing members also connected to a single reference frequency generator applying to said frequency-mixing members a reference frequency differing from the interval of frequencies coming from said frequency multipliers but close to the limits of said frequency interval, at least one counter being connected to each mixing member and said counters, forming said switching elements, being all connected by a control link to said clock unit determining the integrating intervals and the time separating these intervals, so that said counters are opened by said clock unit for counting the number of pulses coming from said mixing members during integrating intervals, said counters being connected to said computer.

10. Device according to claim 9 comprising further a second counter connected to each of said mixing members, a reference counter device for current periods circulating in the phase conductors and connected to all the second counters for controlling their opening and an interval counter connected, on the one hand, to said controlling clock unit, and on the other hand, to said reference generator, so that said second counters are open for counting the number of pulses of said mixing members during an equal time, both to an entire number of current periods circulating in the section of line and an entire number of each time interval containing an integrating interval, said second counters being also connected to said computer.

11. Device according to claim 10, supplementarily further comprising, interposed between said voltage-to-frequency converters and those of said frequency multipliers determining the current intensity circulating in each phase conductor and those determining the derivative of this current intensity, an indirect transmission assembly separating from the potential of the line said frequency multipliers, mixing members, counters and computer.

12. Device according to claim 11, in which the indirect transmission assembly comprises a photoluminescent diode connected to each voltage-to-frequency converter, an optic fiber connected to said diode and to a second photoluminescent diode forming a receiving diode and an amplifier connected, on the one hand, to said receiving diode, and on the other hand, to said frequency multiplier.

13. Device according to claim 8 comprising, for each phase conductor, a voltage divider and at least one current intensity transformer, a derivating circuit connected to said transformer, a first set of switching members respectively connected to said voltage divider, to said transformer and to said derivating circuit, a first set of capacitors respectively connected to each of said switching members, a second set of switches also respectively connected, on the one hand, to each of said capacitors, and on the other hand, to at least one coding voltmeter connected to said computer, said first set of switches being directly connected by a control conductor to said clock unit and the second set of switches being connected also to said clock unit by a common control link comprising a delay circuit interposed between said common link and each switching member of said second set, so that said clock unit simultaneously closes said first set of switches during the integrating interval, then opens it at the end of this interval, said capacitors storing energy during said interval and said clock unit then successively closing the switches of said second set, so that said capacitors are thus emptied in said coding voltmeter to which they are connected, said coding voltmeter consequently transmitting data to said computer.

14. Device according to claim 13, further comprising a third set of capacitor respectively interposed between an upstream switch and a downstream switch, said upstream switches being respectively connected to the input of said first set of switches and said downstream switches each being connected to at least a coding voltmeter, itself connected to said computer, a counter for the periods of the AC circulating in the line being provided and being connected by a control conductor to an interval counter itself connected by a control conductor to said clock unit, so that said counter for the periods causes said interval counter to count an entire number of time intervals each containing an integrating interval and corresponding to an entire number of periods of the AC and said interval counter being connected, by a control conductor and by delay circuits, to said downstream switches, whereas said upstream switches are directly connected to said interval counter, so that the capacitors connected to the latter switches store energy during a time corresponding to an entire number of periods and that said downstream switches then transmit said energy to the coding voltmeter whose data are thus brought to said computer.

15. Device according to claim 12 supplementarily comprising further, for said voltage-to-frequency converters placed at the potential of the line a circuit of electrical energy supply comprising a voltage divider connected to said line, at least one transformer fed by said voltage divider, a rectifying and filtering circuit by which a direct current under at least one voltage is supplied to said voltage-to-frequency converters, at least one accumulator battery connected to said rectifying circuit by a charge resistance, a two-position relay interposed between said transformer and said rectifying and filtering circuit, said relay having a control coil fed by said transformer so that said relay is kept in working position as long as sufficient voltage exists in the line for ensuring the supply of said voltage-to-frequency converters and the charge of said battery, an ondulating device being interposed between said battery and said relay and branched onto a rest contact of said relay, so that said ondulating device is fed by said battery when said terminal of said relay is no longer fed, and a deferred action device interposed between said battery and said ondulating device, so that the link between said battery and said ondulating device is only maintained during a given time by said deferred action device.

16. Device according to claim 15, comprising further a photoresistance permanently connected to said battery, an optic link for ensuring lumination of said photoresistance, a relay fed by said photoresistance and connected to said deferred action device for resetting said device when said photoresistance is luminated, and an electric generator, said deferred action device being associated with an air turbine to recharge said battery, and a pipe in an isolating material permitting compressed air to be sent from the ground to said turbine.

UNITED STATES PATENT OFFICE
CERTIFICATE OF CORRECTION

Patent No. 3,593,124   Dated July 13, 1971

Inventor(s) Gilbert Moise Cahen - Henri Georges Guyard - and Henry P. Souillard Michel/

It is certified that error appears in the above-identified patent and that said Letters Patent are hereby corrected as shown below:

Claim 3, line 4, the equation should read:

$$(u_h = r_h i_h + l_h \frac{di_h}{dt}),$$

Signed and sealed this 23rd day of November 1971.

(SEAL)
Attest:

EDWARD M. FLETCHER, JR.  ROBERT GOTTSCHALK
Attesting Officer         Acting Commissioner of Patents